（12）United States Patent
Gil

(10) Patent No.: US 12,321,889 B2
(45) Date of Patent: *Jun. 3, 2025

(54) LOCATING, IDENTIFYING, AND SHIFTING OBJECTS IN AUTOMATED OR SEMI-AUTOMATED FASHION INCLUDING DURING TRANSIT

(71) Applicant: UNITED PARCEL SERVICE OF AMERICA, INC., Atlanta, GA (US)

(72) Inventor: Julio Gil, Veldhoven (NL)

(73) Assignee: United Parcel Service of America, Inc., Atlanta, GA (US)

( * ) Notice: Subject to any disclaimer, the term of this patent is extended or adjusted under 35 U.S.C. 154(b) by 197 days.

This patent is subject to a terminal disclaimer.

(21) Appl. No.: 17/083,055

(22) Filed: Oct. 28, 2020

(65) Prior Publication Data

US 2022/0129832 A1 Apr. 28, 2022

(51) Int. Cl.
*G06Q 10/087* (2023.01)
*B65G 1/04* (2006.01)
(Continued)

(52) U.S. Cl.
CPC ......... *G06Q 10/087* (2013.01); *B65G 1/0457* (2013.01); *B65G 1/10* (2013.01);
(Continued)

(58) Field of Classification Search
CPC .. G06Q 10/087; G06Q 10/083; B65G 1/0457; B65G 1/10; B65G 1/137;
(Continued)

(56) References Cited

U.S. PATENT DOCUMENTS 9,751,693 B1 9/2017 Battles et al.
9,823,662 B2 11/2017 Mecklinger et al.
(Continued)

FOREIGN PATENT DOCUMENTS

AT 516875 A2 9/2016
CN 106715292 A 5/2017
(Continued)

OTHER PUBLICATIONS

Non-Final Office action received for U.S. Appl. No. 17/083,017, mailed on Dec. 21, 2021, 16 pages.
(Continued)

*Primary Examiner* — Florian M Zeender
*Assistant Examiner* — Kimberly S. Bursum
(74) *Attorney, Agent, or Firm* — Shook, Hardy & Bacon L.L.P.

(57) ABSTRACT

Detecting, locating, identifying, engaging, and/or shifting objects in automated or semi-automated fashion as well as methods, systems, apparatuses, and computer-program products therefor. Embodiments used for shifting objects in automated or semi-automated fashion may be implemented in stationary environments, and/or in moving, e.g., in-transit, environments, and may be used to transfer, route, and/or organize objects based on their designated destinations. The embodiments may further be implemented in a logistics network, thereby increasing the efficiency and capacity of the logistics network, among other benefits.

18 Claims, 15 Drawing Sheets

(51) Int. Cl.
*B65G 1/10* (2006.01)
*B65G 1/137* (2006.01)
*G01S 17/42* (2006.01)
*G06K 7/10* (2006.01)
*G06K 7/14* (2006.01)
*G06K 19/06* (2006.01)
*G06K 19/07* (2006.01)
*G06Q 10/083* (2024.01)
*G06V 20/10* (2022.01)
*G06V 20/64* (2022.01)

(52) U.S. Cl.
CPC .............. *B65G 1/137* (2013.01); *G01S 17/42* (2013.01); *G06K 7/10297* (2013.01); *G06K 7/1413* (2013.01); *G06K 19/06028* (2013.01); *G06K 19/0723* (2013.01); *G06Q 10/083* (2013.01); *G06V 20/10* (2022.01); *G06V 20/64* (2022.01); *G06K 2007/10504* (2013.01)

(58) Field of Classification Search
CPC ............... B65G 1/0435; B65G 47/902; B65G 2203/0216; B65G 2203/0225; B65G 2203/0233; B65G 2203/041; B65G 2203/046; B65G 1/133; B65G 2207/08; G01S 17/42; G06K 7/10297; G06K 7/1413; G06K 19/06028; G06K 19/0723; G06K 2007/10504; G06V 20/10; G06V 20/64; B60P 3/007; B66F 9/07
See application file for complete search history.

(56) References Cited

U.S. PATENT DOCUMENTS

| | | | |
|---|---|---|---|
| 10,346,794 B2 | 7/2019 | High et al. | |
| 10,433,659 B1* | 10/2019 | Pedersen | A47F 5/0093 |
| 10,569,976 B2 | 2/2020 | Lewis et al. | |
| 11,292,667 B2* | 4/2022 | Toebes | G06Q 50/28 |
| 2004/0067129 A1 | 4/2004 | Krawczyk et al. | |
| 2008/0006698 A1* | 1/2008 | Kotlarsky | G06K 7/10722 235/462.42 |
| 2009/0009597 A1* | 1/2009 | Belkin | G08B 13/19686 348/143 |
| 2009/0162176 A1 | 6/2009 | Link et al. | |
| 2010/0106287 A1 | 4/2010 | Iizuka | |
| 2010/0247275 A1 | 9/2010 | Karlen et al. | |
| 2016/0224930 A1 | 8/2016 | Kadaba et al. | |
| 2016/0236865 A1 | 8/2016 | Altemir | |
| 2017/0174431 A1* | 6/2017 | Borders | B65G 1/0492 |
| 2017/0185959 A1 | 6/2017 | Meurer | |
| 2017/0200197 A1* | 7/2017 | Brubaker | B60Q 1/2619 |
| 2017/0225890 A1 | 8/2017 | Li | |
| 2018/0127208 A1 | 5/2018 | Preidt et al. | |
| 2018/0201445 A1 | 7/2018 | Battles et al. | |
| 2018/0265295 A1* | 9/2018 | Beckman | B61D 17/16 |
| 2019/0143872 A1* | 5/2019 | Gil | B60P 1/4471 211/86.01 |
| 2019/0352092 A1 | 11/2019 | Zheng et al. | |
| 2020/0130935 A1* | 4/2020 | Wagner | B65G 1/1373 |
| 2020/0175471 A1 | 6/2020 | Tsuruta et al. | |
| 2022/0129831 A1 | 4/2022 | Gil | |
| 2022/0129833 A1 | 4/2022 | Gil | |

FOREIGN PATENT DOCUMENTS

| | | | |
|---|---|---|---|
| CN | 109685425 A | 4/2019 | |
| CN | 208882924 U | 5/2019 | |
| CN | 111348361 A | 6/2020 | |
| CN | 210883786 U | 6/2020 | |
| CN | 109080747 B | 9/2020 | |
| DE | 10225332 A1 | 1/2004 | |
| DE | 102006007359 A1 | 8/2007 | |
| DE | 102012102075 A1 | 9/2013 | |
| EP | 1273531 A1 | 1/2003 | |
| EP | 1447354 A1 | 8/2004 | |
| EP | 1820754 A2 * | 8/2007 | ........... B65G 1/0407 |
| EP | 3228496 A2 | 10/2017 | |
| EP | 3557542 A1 | 10/2019 | |
| EP | 3663235 A1 | 6/2020 | |
| GB | 2568768 A | 5/2019 | |
| IT | 20110377 A1 | 10/2012 | |
| JP | 56-3205 A | 1/1981 | |
| JP | 2-52808 A | 2/1990 | |
| JP | 11-349112 A | 12/1999 | |
| TW | 200811015 A | 3/2008 | |
| WO | 2013/125322 A1 | 8/2013 | |
| WO | 2018/185231 A1 | 10/2018 | |
| WO | 2019/172966 A1 | 9/2019 | |

OTHER PUBLICATIONS

Non-Final Office Action received for U.S. Appl. No. 17/083,100, mailed on Nov. 16, 2021, 18 pages.
Gil, Julio, U.S. Appl. No. 17/083,017, filed Oct. 28, 2020, titled "Locating, Identifying, And Shifting Objects in Automated or Semi-Automated Fashion Including During Transit", 55 pages.
Gil, Julio, U.S. Appl. No. 17/083,100, filed Oct. 28, 2020, titled "Locating, Identifying, And Shifting Objects in Automated or Semi-Automated Fashion Including During Transit", 57 pages.
Final Office Action received for U.S. Appl. No. 17/083,100, mailed on Apr. 4, 2022, 16 pages.
International Search Report and Written Opinion for PCT application No. PCT/US2021/055429, mailed on Feb. 14. 2022, 17 pages.
International Search Report and Written Opinion received for PCT Patent Application No. PCT/US2021/055440, mailed on Feb. 16, 2022, 18 pages.
International Search Report and Written Opinion received for PCT Patent Application No. PCT/US2021/055437, mailed on Feb. 14, 2022, 17 pages.
Non-Final Office Action received for U.S. Appl. No. 17/083,100, mailed on Sep. 26, 2022, 13 pages.
Non-Final Office Action received for U.S. Appl. No. 17/083,017, mailed on May 31, 2023, 14 pages.
Office action received for Canadian Patent Application No. 3196673, mailed on Sep. 16, 2024, 5 pages.
Office action received for Canadian Patent Application No. 3196685, mailed on Aug. 21, 2024, 6 pages.
Office action received for Canadian Patent Application No. 3196689, mailed on Aug. 21, 2024, 5 pages.
Non-Final Office Action received for U.S. Appl. No. 18/434,123, mailed on Mar. 19, 2025, 8 pages.
Office action received for Chinese Patent Application No. 202180074323.3, mailed on Mar. 10, 2025, 10 pages of original copies only.

* cited by examiner

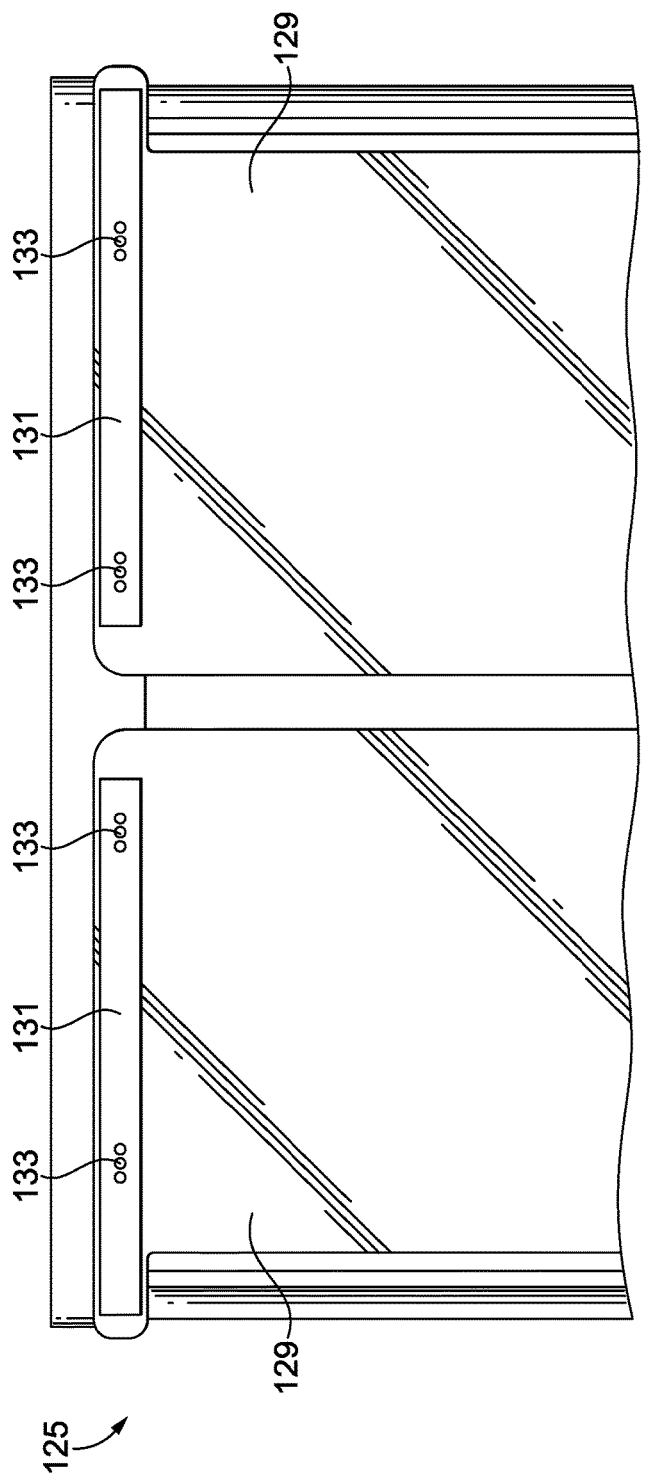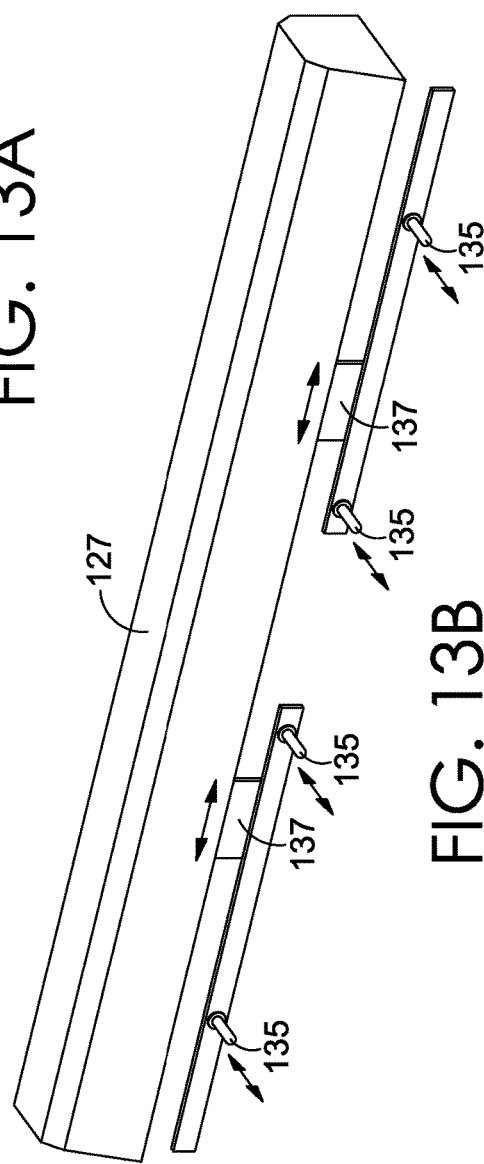
FIG. 13A
FIG. 13B

LOCATING, IDENTIFYING, AND SHIFTING OBJECTS IN AUTOMATED OR SEMI-AUTOMATED FASHION INCLUDING DURING TRANSIT

CROSS-REFERENCE TO RELATED APPLICATIONS

This application is related by subject matter to U.S. patent application Ser. No. 17/083,100 and U.S. patent application Ser. No. 17/083,017, both filed concurrently with the present application on Oct. 28, 2020, both of which are assigned or under obligation of assignment to the same entity, and both of which are incorporated herein by reference in the entirety.

TECHNICAL FIELD

The field relates to automated handling of objects.

BACKGROUND

Transporting objects, e.g., in a logistics network, presents unique challenges. For example, organizing, routing, and tracking a large number of objects (e.g., parcels with contents intended for a specific destination) can require significant resources. Without these resources, and/or without greater efficiency, the capacity to handle objects can be limited. Therefore, improvements in the automated or semi-automated handling and manipulation of objects are needed.

SUMMARY

This summary is intended to introduce a selection of concepts in a simplified form that are further described below in the detailed description section of this disclosure. This summary is not intended to identify key or essential features of the claimed subject matter, nor is it intended to be used as an aid in isolation to determine the scope of the claimed subject matter.

In brief, and at a high level, this disclosure describes, among other things, embodiments used for detecting, locating, identifying, engaging, and/or shifting objects in automated or semi-automated fashion. These embodiments may be implemented in stationary environments, and/or in moving environments, and may be used to transfer, route, and/or organize objects based on their designated destinations. These embodiments may also be utilized in a logistics network to increase the efficiency, capacity, and/or precision of object handling in a logistics network operation, among other benefits.

In one embodiment, an object-shifting system is provided. The object-shifting system may include at least one object-shifting apparatus. The object-shifting apparatus may be configured to detect, locate, identify, engage, and/or shift objects in automated or semi-automated fashion. The object-shifting apparatus may include numerous features and configurations that support this functionality. For example, the object-shifting apparatus may include object-detection components that detect, locate, and/or identify objects, e.g., in a three-dimensional space in which the object-shifting apparatus operates. This may include detecting, identifying, and/or locating the objects themselves or portions thereof, e.g., their edges, dimensions, and/or boundaries, among other characteristics. The object-shifting apparatus may include object-engaging components that are able to engage, hold, transfer, and/or release objects. These object-engaging components may further be adaptable, or dynamically adjustable, allowing them to engage and shift objects of different shapes and sizes, and/or objects positioned at different locations and/or at different orientations. The object-shifting apparatus may be configured to operate from a fixed position in a space, and/or may be movable, e.g., using a shifting mechanism, in different aspects. The objects that are shifted may be transported on object-support structures. The object-support structures may be movable, e.g., using a shifting mechanism, in order to enable relative positioning during an object shifting process, in one aspect. The systems and components used for shifting objects in automated or semi-automated fashion may be directed by one or more computing devices, which may be local, remote, and/or distributed, in different aspects.

In one embodiment, a system for shifting objects is provided. The system comprises a plurality of object-support structures; an object-shifting apparatus configured to locate and identify an object positioned on a first object-support structure of the plurality of object-support structures when the first object-support structure is positioned adjacent to the object-shifting apparatus, engage the object positioned on the first object-support structure, and transfer the object onto a second object-support structure of the plurality of object-support structures; a shifting mechanism operable to move the plurality of object-support structures to different locations; and a computing device configured to direct operation of the object-shifting apparatus, and the shifting mechanism.

In another embodiment, a method for shifting objects is provided. The method comprises moving, using a shifting mechanism, a first object-support structure to a first location in a space, wherein the first location is adjacent to an object-shifting apparatus; determining, using at least one object-detection component, an identity of an object positioned on the first object-support structure; determining, using the at least one object-detection component, a location of the object in a three-dimensional space in which the object-shifting apparatus operates; moving, using the shifting mechanism, a second object-support structure to a second location in the space, wherein the second location is adjacent to the object-shifting apparatus; engaging, using one or more object-engaging components of the object-shifting apparatus, the object positioned on the first object-support structure; shifting the object to the second object-support structure; and releasing the object onto the second object-support structure.

In another embodiment, a system for shifting objects during transit is provided. The system comprises a plurality of object-support structures; a shifting mechanism operable to move the plurality of object-support structures to different locations in a space; an object-shifting apparatus configured to locate and identify objects positioned on the plurality of object-support structures, and engage and shift the objects to different object-support structures; and a computing device configured to direct operation of the object-shifting apparatus and the shifting mechanism.

In another embodiment, an object-shifting apparatus is provided. The object-shifting apparatus comprises a base; a frame extending from the base; and an object-shifting mechanism, the object-shifting mechanism being movable to different positions along the frame, and the object-shifting mechanism comprising one or more object-engaging components useable for engaging and shifting objects having a range of different dimensions; and at least one object-detection component configured to determine a location of an object positioned in a three-dimensional space in which the object-shifting apparatus operates, and determine an identity of the object.

In another embodiment, an object-shifting system is provided. The object-shifting system comprises a guide track; a plurality of object-support structures each comprising a track-engaging structure adapted to be coupled to the guide track, thereby allowing the coupled object-support structure to move along the guide track; an object-shifting apparatus comprising a base, a frame extending from the base, and an object-shifting mechanism, wherein the object-shifting mechanism is movable to different positions along the frame, and wherein the object-shifting mechanism comprises one or more object-engaging components useable for engaging and shifting objects of a range of different dimensions, and at least one object-detection component configured to determine a location of an object positioned in a three-dimensional space in which the object-shifting apparatus operates, and determine an identity of the object.

In another embodiment, a method of shifting objects using an object-shifting apparatus comprising a base, a frame extending from the base, an object-shifting mechanism movable along the frame, and at least one object-detection component is provided. The method comprises moving the object-shifting mechanism to a position on the frame that is adjacent to an object; detecting the object using the at least one object-detection component; determining an identity of the object based on a unique identifier associated with the object; determining a location of the object in a three-dimensional space in which the object-shifting mechanism operates; engaging the identified and located object using the object-shifting mechanism; and shifting the object to a location associated with a designated destination of the object.

In another embodiment, a computer-implemented method for directing the shifting of objects is provided. The method comprises directing a shifting mechanism to move a first object-support structure of a plurality of object-support structures to a first location in a space, the first location being located in a three-dimensional space in which an object-shifting apparatus operates; receiving, from the object-shifting apparatus, identifying data associated with an object positioned on the first object-support structure; determining a designated destination of the object based at least in part on the identifying data; directing the shifting mechanism to move a second object-support structure of the plurality of object-support structures to a second location in the space based on the second object-support structure being associated with the designated destination of the object, the second location being located in the three-dimensional space in which the object-shifting apparatus operates; and directing the object-shifting apparatus to transfer the object from the first object-support structure to the second object-support structure.

In another embodiment, one or more computer-readable media having computer-executable instructions stored thereon that, when executed by one or more processors, perform a method for directing the shifting of objects are provided. The method comprises directing a shifting mechanism to move a first object-support structure of a plurality of object-support structures to a first location in a space, the first location being located in a three-dimensional space in which an object-shifting apparatus operates; receiving, from the object-shifting apparatus, identifying data associated with an object positioned on the first object-support structure; determining a designated destination of the object based at least in part on the identifying data; directing the shifting mechanism to move a second object-support structure of the plurality of object-support structures to a second location in the space based on the second object-support structure being associated with the designated destination of the object, the second location being located in the three-dimensional space in which the object-shifting apparatus operates; and directing the object-shifting apparatus to transfer the object from the first object-support structure to the second object-support structure.

In another embodiment, a computer system is provided. The computer system comprises at least one processor; at least one memory; and one or more computer-readable media having computer-executable instructions stored thereon that, when executed by one or more processors, perform a method for directing the shifting of objects. The method comprises directing a shifting mechanism to move a first object-support structure of a plurality of object-support structures to a first location in a space, the first location being located in a three-dimensional space in which an object-shifting apparatus operates; receiving, from the object-shifting apparatus, identifying data associated with an object positioned on the first object-support structure; determining a designated destination of the object based at least in part on the identifying data; directing the shifting mechanism to move a second object-support structure of the plurality of object-support structures to a second location in the space based on the second object-support structure being associated with the designated destination of the object, the second location being located in the three-dimensional space in which the object-shifting apparatus operates; and directing the object-shifting apparatus to transfer the object from the first object-support structure to the second object-support structure.

The term "object," as used herein, should be interpreted broadly, to include any one, or combination, of items that may be transported from one location to another. For example, in one non-limiting aspect, an "object" may be a parcel with contents intended for a particular destination, e.g., in a logistics network. The phrase "logistics network," as used herein, should also be interpreted broadly, to include any one, or combination, of persons, equipment, locations, and/or mobile transports (e.g., vehicles, railway transports, ships, aircraft, and the like, including those that operate autonomously or semi-autonomously) that are used to transfer objects to different destinations.

BRIEF DESCRIPTION OF THE DRAWINGS

Embodiments of the disclosure that are used for shifting objects in automated or semi-automated fashion are described in detail below with reference to the attached drawing figures, which are intended to illustrate non-limiting examples, wherein:

FIG. 13A depicts part of a door assembly, in accordance with an embodiment hereof;

FIG. 13B depicts a door-engaging mechanism, in accordance with an embodiment hereof;

DETAILED DESCRIPTION

Figure 1:
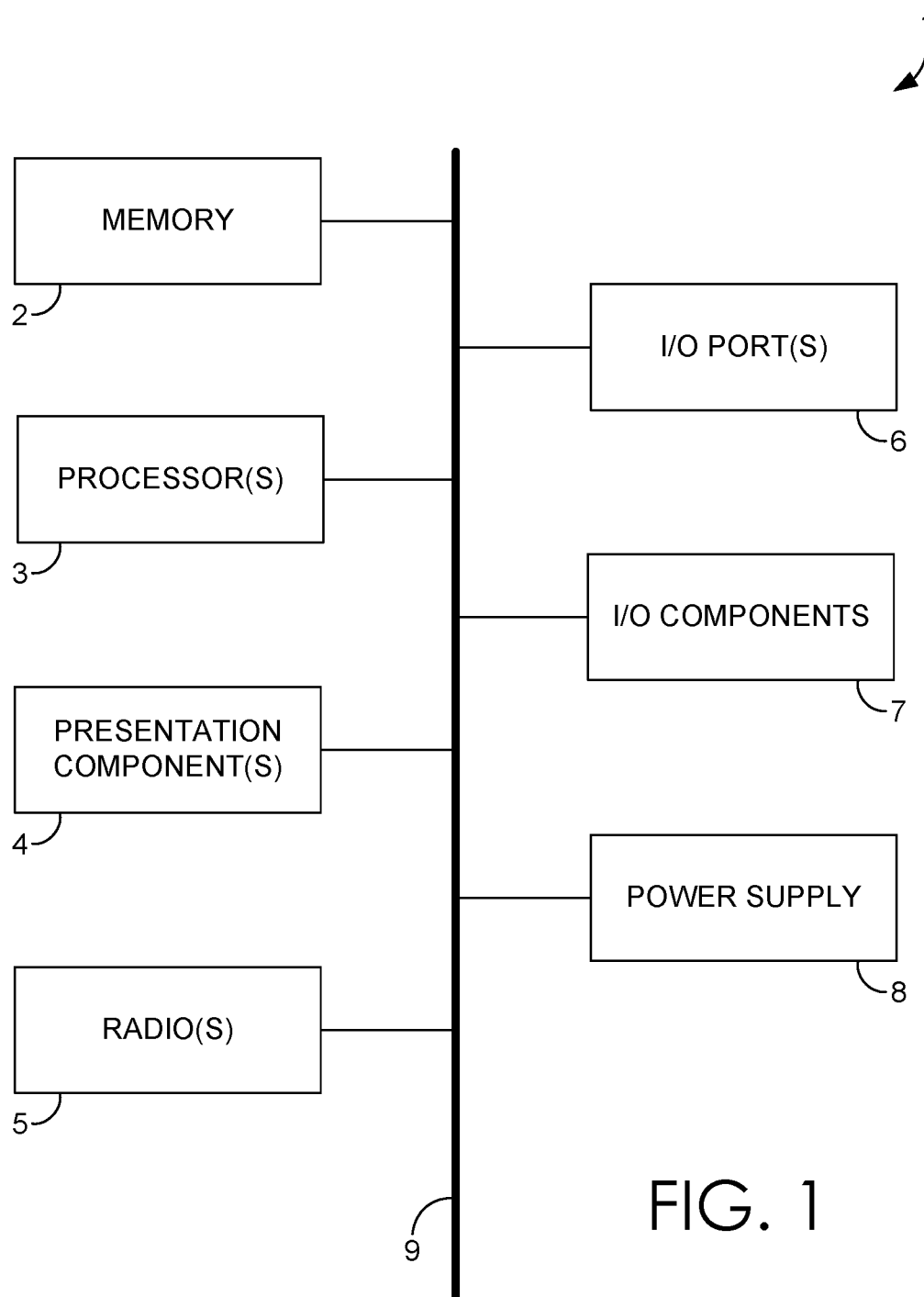
FIG. 1 depicts an example computing system suitable for supporting operation of different embodiments described herein.

This detailed description is provided in order to meet statutory requirements. However, this description is not intended to limit the scope of the invention. Rather, the claimed subject matter may be embodied in other ways, to include different steps, combinations of steps, different features, and/or different combinations of features, similar to those described in this disclosure, and in conjunction with other present or future technologies. Moreover, although the terms "step" and "block" may be used herein to identify different elements of methods employed, the terms should not be interpreted as implying any particular order among or between different elements except when the order is explicitly stated.

In general, this disclosure describes embodiments used for detecting, locating, identifying, engaging, and/or shifting objects in automated or semi-automated fashion. These embodiments may be implemented in stationary environments, and/or in moving environments, in different aspects, and may be used to organize, transfer, and/or route objects based on their designated destinations. The embodiments may further be implemented in a logistics network to increase the efficiency, capacity, and/or precision of an associated logistics network operation. Example aspects that achieve these benefits are described below with reference to FIGS. 1-17.

The subject matter described herein may be implemented as a method, a system, and/or a computer-program product, among other things. Accordingly, certain aspects may take the form of hardware, or software, or may be a combination of software and hardware. A computer-program that includes computer-useable instructions embodied on one or more computer-readable media may also be used. The subject matter may further be implemented as hard-coded into the mechanical design of computing components and/or may be built into a system, apparatus, and/or component used for detecting, identifying, locating, engaging, and/or shifting objects as described herein.

The computer-readable media described herein may include volatile media, non-volatile media, removable media, and non-removable media, and may also include media readable by a database, a switch, and/or various other network devices. Network switches, routers, and related components are conventional in nature, as are methods of communicating with the same, and thus, further elaboration is not provided here. By way of example, and not limitation, computer-readable media may comprise computer storage media and/or non-transitory communications media.

The computer storage media, or machine-readable media, described herein may include media implemented in any method or technology for storing information. Examples of stored information may include computer-useable instructions, data structures, program modules, and/or other data representations. Computer storage media may include, but is not limited to, RAM, ROM, EEPROM, flash memory or other memory technology, CD-ROM, digital versatile discs (DVD), holographic media or other optical disc storage, magnetic cassettes, magnetic tape, magnetic disk storage, and other storage devices. These memory components may store data momentarily, temporarily, and/or permanently, and are not limited to the examples provided in this section.

Referring now to FIG. 1, a block diagram of an example computing device 1 suitable for supporting operations described herein is provided, in accordance with an embodiment hereof. It should be understood that, although some components depicted in FIG. 1 are shown in the singular, they may be plural, and the components may be connected in a different, e.g., local or distributed, configuration. For example, computing device 1 might include multiple processors and/or multiple radios. As shown in FIG. 1, computing device 1 includes a bus 9 that may directly or indirectly connect different components together, including memory 2, processor(s) 3, presentation component(s) 4 (if applicable), radio(s) 5, input/output (I/O) port(s) 6, input/output (I/O) component(s) 7, and power supply 8.

Memory 2 may take the form of the memory components described herein. Thus, further elaboration will not be provided here, but memory 2 may include any type of tangible medium that is capable of storing information, such as a database. A database may include any collection of records, data, and/or other information. In one embodiment, memory 2 may include a set of computer-executable instructions that, when executed, perform different functions or steps described herein. These instructions will be referred to as "instructions" or an "application" for short. The processor 3 may actually be multiple processors that may receive instructions and process them accordingly. The presentation component 4 may include a display, a speaker, a screen, a portable digital device, and/or other components that may present information through visual, auditory, and/or other tactile cues (e.g., a display, a screen, a lamp, a light-emitting diode (LED), a graphical user interface (GUI), and/or a lighted keyboard).

The radio 5 may support communication with a network, and may additionally or alternatively facilitate different types of wireless communications, such as Wi-Fi, WiMAX, LTE, Bluetooth, and/or VoIP communications, among other communication protocols. In various aspects, the radio 5 may be configured to support multiple technologies, and/or multiple radios may be configured and utilized to support multiple technologies.

The input/output (I/O) ports 6 may take a variety of forms. Example I/O ports may include a USB jack, a stereo jack, an infrared port, a firewire port, and/or other proprietary communication ports. The input/output (I/O) components 7 may comprise one or more keyboards, microphones, speakers, touchscreens, and/or any other item useable to directly or indirectly input data into the computing device 1. The power supply 8 may comprise batteries, generators, fuel cells, and/or any other component that may act as a power source to supply power to computing device 1 and to any other components described herein.

Figure 2:
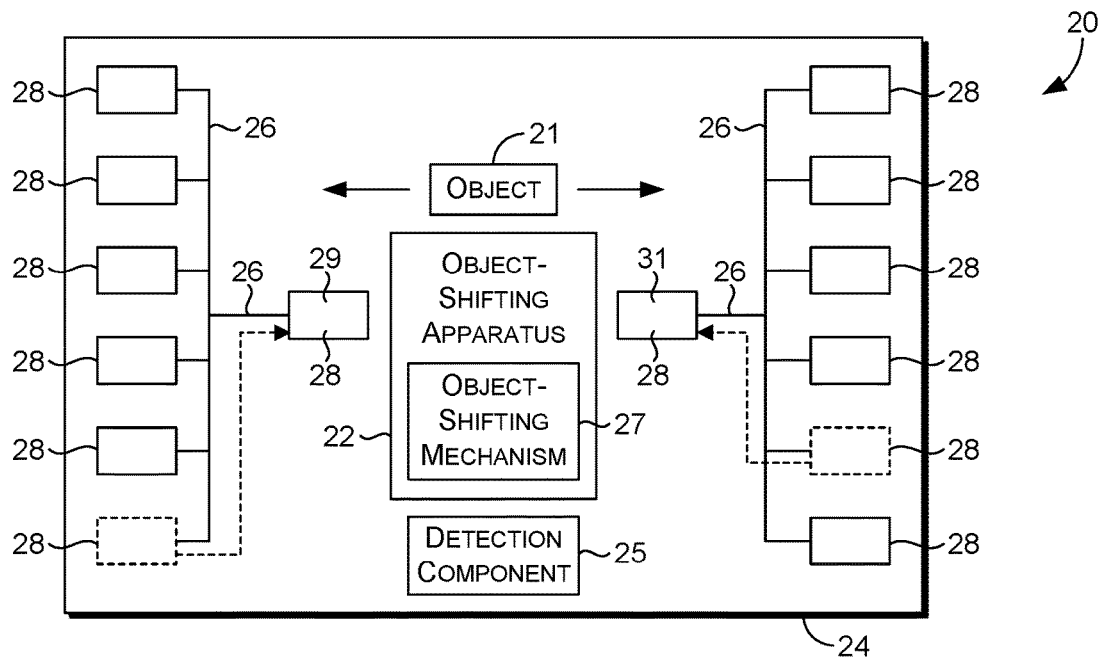
FIG. 2 depicts a generically represented object-shifting system, in accordance with an embodiment hereof.

Referring now to FIG. 2, a generically represented system 20 used for shifting objects in automated or semi-automated fashion is provided, in accordance with an embodiment hereof. The system 20 includes elements that are configured to detect, locate, identify, engage, shift, and/or release objects and/or their associated object-support structures. The system 20 is depicted in generic form for the purposes of clarity, simplicity, and explanation. However, it should be understood that in actual implementation, the system 20, and components thereof, may be embodied in more detailed configurations. The system 20 shown in FIG. 2 is also intended to represent one of many possible configurations of such a system contemplated herein.

The system 20 includes an object-shifting apparatus 22, a plurality of object-support structures 28, and a shifting mechanism 26, each depicted generically, and each located in a space 24. The object-support structures 28 may be used to support and/or hold objects, e.g., those being transported to designated destinations, e.g., in a logistics network. The object-shifting apparatus 22 may be configured to detect, locate, identify, engage, and/or shift the objects, e.g., to and/or from the object-support structures 28. The shifting mechanism 26 may be configured to relocate elements of the system 20 about the space 24, e.g., the object-support structures 28, and/or the object-shifting apparatus 22, in different aspects. To accomplish this, the shifting mechanism 26 may utilize tracks, rails, guides, actuators, couplings, mechanisms, control systems, and/or other components to facilitate the shifting of different elements of the system 20.

The system 20 includes an object-detection component 25. The object-detection component 25 may be configured to detect, locate, and/or identify objects and/or object-support structures located in the space 24, in different aspects. The object-detection component 25 may, in actual implementation, be multiple components, which may be local, e.g., to the object-shifting apparatus 22, and/or distributed, e.g., about the system 20, in different aspects. The object-detection component 25 may utilize sensors, scanners, imaging components (e.g., cameras, image/video processors, and/or other vision-based components), light detection and ranging (LIDAR) components, wireless communication components, radio frequency identification (RFID) components, and/or other data-capturing and/or data-processing components in order to perform different detection processes in the space 24.

The object-detection component 25 may be configured to locate objects in the space 24. For example, the object-detection component 25 may be configured to identify a location of an object in a three-dimensional space, e.g., in which the object-shifting apparatus 22 operates. For example, the location may be identified as a geometric coordinate, or a set of geometric coordinates, in a three-dimensional geometric coordinate system. The location of an object, once determined, may be used by other elements of the system 20, e.g., the object-shifting apparatus 22, the object-shifting mechanism 27, and/or the shifting mechanism 26, among others. The object-detection component 25 may also be configured to detect, and locate, the object-support structures 28 in the space 24.

The object-detection component 25 may be configured to determine characteristics of objects located in the space 24. These characteristics may include the shape, size, orientation, and/or physical features of the objects, among other characteristics. For example, dimensions such as the height, width, and/or depth of an object may be determined by the object-detection component 25; physical attributes or boundaries of an object may be determined by the object-detection component 25; and/or the orientation of an object in a three-dimensional space may be determined by the object-detection component 25. The object-detection component 25 may also be configured to identify known reference points located on an object, for use in engaging the object. The detected characteristics may be used by other elements of the system 20, e.g., the object-shifting apparatus 22. The object-detection component 25 may also be configured to determined such characteristics of the object-support structures 28 located in the space 24, as well.

The object-detection component 25 may be configured to identify objects located in the space 24. For example, the object-detection component 25 may be configured to detect, or recognize, a unique identifier associated with an object. This unique identifier may be a unique visual indicia, a unique machine-readable indicia, a unique RFID signal, and/or another unique indicia or signal. As a further example, the object-detection component 25 may be configured to recognize objects, e.g., boxes or packages, by detecting or identifying certain uniquely identifiable attributes, such as the location of certain materials, e.g., closing tape or other securing elements, or other unique physical aspects or defects of the objects. The object-detection component 25 may further include computing components that enable it to identify an object based on a unique identifier that is detected, and/or may include communication components that are able to transmit the identity of the object to another computing device, e.g., a central server in communication with multiple elements of the system 20. The determined identity of an object may be stored in memory and/or used to update a database, e.g., a shipping manifest, in different aspects. The object-detection component 25 may also be used to identify the object-support structures 28 using a similar process.

To illustrate one example operation of the system 20, the following non-limiting process is described. First, the shifting mechanism 26 shifts an object-support structure 29 to a location adjacent to the object-shifting apparatus 22, as shown in FIG. 2. The object-detection component 25 then detects, locates, and determines an identity of an object 21 that is initially positioned on the object-support structure 29. This identity, once determined, is used to determine a designated destination of the object 21, e.g., in a logistics network, in one contemplated aspect. Then, based on the designated destination, the shifting mechanism 26 shifts another object-support structure 31 associated with the designated destination to a location that is also adjacent to the object-shifting apparatus 22, as shown in FIG. 2. The object-shifting apparatus 22 then shifts the object 21 from the object-support structure 29 to the object-support structure 31, as shown in FIG. 2. This process may be repeated to allow for the transfer of other objects to different object-support structures 28. This process may occur in automated or semi-automated fashion, and may be directed, for example, by a computing device that directs multiple elements of the system 20, e.g., allowing them to operate in coordination. In additional embodiments, multiple object-shifting apparatuses may be used, which may be movable using the shifting mechanism 26, for greater adaptability.

The system 20 and components thereof may be communicatively connected to, and/or controlled by, one or more computing devices. The computing devices may be local to the system 20 shown in FIG. 2, remote from the system 20 shown in FIG. 2, and/or may be distributed, e.g., provided at separate locations and connected over a network. The computing devices may update stored data, e.g., in memory and/or a database, based on objects being identified and/or shifted. For example, each time an object is identified and/or shifted, this information may be used to update a database, and/or an update on the routing status of the object may be communicated, e.g., to an intended recipient of the object.

The object-shifting apparatus 22 includes an object-shifting mechanism 27, also depicted generically. The object-shifting mechanism 27 may include a selection of components that allow it to dynamically, or adaptively, engage, shift, and release objects, including those of different shapes and sizes. For example, the object-shifting mechanism 27 may include one or more object-engaging components that can be actuated to engage, hold, and transfer objects. These object-engaging components may, in different aspects, be configured to extend, retract, raise, lower, pivot, or otherwise translate and/or re-position and/or re-orient in order to engage (e.g., grasp, hold, and/or support) different objects. The object-shifting mechanism 27 may further include one or more sensors, e.g., contact or pressure sensors. The object-engaging components may use such sensors to determine when an object has been contacted, and/or when an object is sufficiently braced or held, to allow for appropriate shifting/transfer.

Figure 3:
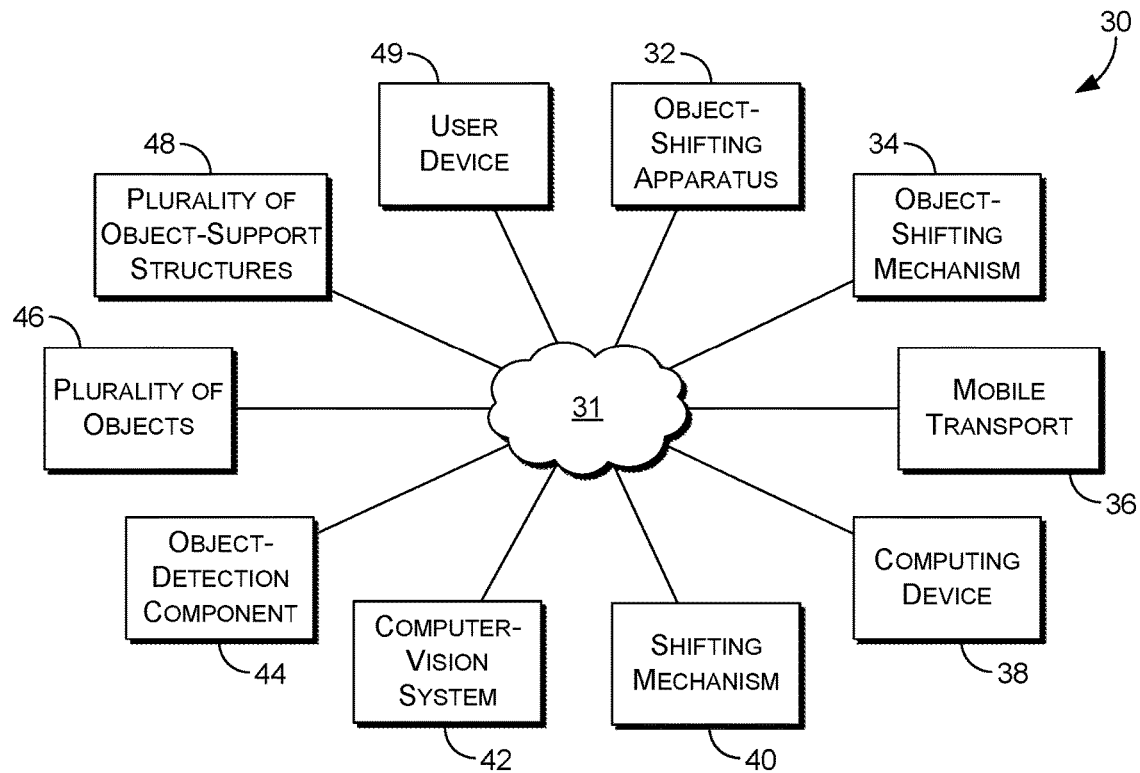
FIG. 3 depicts a network of components that may be used with a system for shifting objects, in accordance with an embodiment hereof.

Referring now to FIG. 3, a network diagram 30 showing a selection of components that may be used with a system for shifting objects is provided, in accordance with an embodiment hereof. The selection of components depicted in FIG. 3 is intended to represent one non-limiting example, and in other embodiments, more components, fewer components, and/or different components and/or different combinations of components may be used, instead of the selection depicted in FIG. 3. The components shown in FIG. 3 are connected over a network 31, and in different aspects may be local (e.g., integrated, at least in part, into a common structure), and/or may be distributed (e.g., physically separate, at least in part, but communicatively connected).

FIG. 3 depicts an object-shifting apparatus 32, which is connected to the network 31. The object-shifting apparatus 32, as described with respect to FIG. 2, may be used to detect, locate, identify, engage, support, shift, and/or release or re-position objects in a three-dimensional space. The object-shifting apparatus 32 may operate in automated fashion, or in semi-automated fashion, with some form of operator control and/or some form of computer control, in different aspects. The object-shifting apparatus 32 may operate in a stationary environment, and/or may operate in a moving environment, in different aspects. The object-shifting apparatus 32 may, like the other components of the system 30, be utilized in a logistics network, and in such instance, may be used to shift or route objects towards their ultimate destinations in the logistics network. The object-shifting apparatus 32 may also be in communication with, and/or may be directed by, a computing device, such as computing device 38.

FIG. 3 also depicts an object-shifting mechanism 34, which is connected to the network 31. The object-shifting mechanism 34 may be integrated, at least in part, with the object-shifting apparatus 32, or may be at least partially distinct, in different aspects. The object-shifting mechanism 34 may include components that allow it to adaptively, or dynamically, engage, hold, and shift objects in a three-dimensional space. The object-shifting mechanism 34 may include object-engaging components that are adjustable/adaptable, in this sense. These components may be used to engage, hold, and/or transfer objects of different shapes, sizes, and dimensions, and/or objects positioned at different locations and/or orientations. The object-shifting mechanism 34 may also be in communication with, and/or may be directed by, a computing device, such as computing device 38.

FIG. 3 also depicts a mobile transport 36, which is connected to the network 31. The mobile transport 36, as described with respect to FIG. 2, may be any vehicle, ship, aircraft, railway transport, or the like, including those that are autonomously or semi-autonomously operated, that is capable of transporting objects. The embodiments described herein that allow for shifting objects in automated or semi-automated fashion may, in different aspects, be integrated into storage spaces of such mobile transports. The mobile transport 36 may also be in communication with, and/or may be directed by, a computing device, such as computing device 38.

FIG. 3 also depicts a computing device 38, which is connected to the network 31. The computing device 38 may represent a single computing device, or may represent multiple computing devices, either local or distributed, in different aspects. The computing device 38 may include one or more processors and/or one or more memories. The computing device 38 may direct operation of elements of the system 30, e.g., supporting the automated or semi-automated operation of those elements. The computing device 38 may include, or may be connected to, a database. The database may store or maintain details of objects that are being transported. This information may include the status of an object's transit, the designated destination of the object, and, if the object is a parcel, the contents of the object, among other information.

FIG. 3 also depicts a shifting mechanism 40, which is connected to the network 31. The shifting mechanism 40, as described with respect to FIG. 2, may be coupled to different elements of the system 30, thereby allowing those elements to be moved to different locations, e.g., in a space, to facilitate shifting and transfer of objects in automated or semi-automated fashion. For example, the shifting mechanism 40 may be coupled to a plurality of object-support structures 48 used to transport objects, and may be used to shift those object-support structures 48 to different locations in an object-sorting area, to facilitate shifting. The shifting mechanism 40 may also be coupled to the object-shifting apparatus 32 (of which there may be multiple) thereby allowing the object-shifting apparatus 32 to also be shifted. The shifting mechanism 40 may also be in communication with, and/or may be directed by, a computing device, such as computing device 38.

FIG. 3 also depicts a computer-vision system 42, which is connected to the network 31. The computer-vision system 42 may be associated with the object-shifting apparatus 32, and/or with other elements of the system 30. The computer-vision system 42 may represent a collection of components that are used to visually detect, locate, and/or identify objects in a three-dimensional space. For example, the computer-vision system 42 may use sensors, imaging components (e.g., cameras, LIDAR components, etc.), lighting elements, scanners, processors, and/or other detection, processing, and/or communication components that enable the detection and/or identification of objects located in a three-dimensional space. The computer-vision system 42 may also include, or operate in connection with, the object-detection component(s) 44, described further below.

The computer-vision system 42 may be configured to identify objects located in a three-dimensional space. This identification may be based on the detection of unique identifiers associated with the objects, as described herein. For example, the computer-vision system 42 may be configured to detect a visual indicia present on an object (e.g., a barcode, identification number, digital watermark, or the like). In another aspect, the computer-vision system 42 may be configured to locate objects in a three-dimensional space, e.g., in which the object-shifting apparatus 32 operates. For example, the computer-vision system 42 may be configured to identify one or more geometric coordinates in a three-dimensional geometric coordinate system that are associated with the object. For example, these geometric coordinates may represent edges, boundaries, and/or surfaces of the detected objects, among other things. The locating process may further include determining depth values for different parts of an object in the three-dimensional geometric coordinate system. In another aspect, the computer-vision system 42 is configured to detect characteristics of an object. For example, this might include an object's shape, size, orientation, and/or its relative positioning compared to other objects/structures. The computer-vision system 42, and/or the object-detection component 44, may include any combination of the aforementioned capabilities. The computer-vision system 42 may also be in communication with, and/or may be directed by, a computing device, such as computing device 38.

FIG. 3 also depicts an object-detection component 44, which is connected to the network 31. The object-detection component 44, as noted above, may be associated with, and/or may form part of, the computer-vision system 42, in one aspect. The object-detection component 44 may be configured to detect, locate, and/or identify objects in a three-dimensional space, and may represent one component, or multiple components that operate in coordination, in different aspects. The object-detection component 44 may utilize, for detection purposes, vision-based components, e.g., cameras, image processors, laser-measurement or laser-scanning components, or the like, and/or communication-based components, e.g., RFID, Bluetooth, or other wireless or near-field communication components and protocols. The object-detection component 44 may also be in communication with, and/or may be directed by, a computing device, such as computing device 38.

FIG. 3 also depicts a plurality of objects 46, which are connected to the network 31. The objects 46 may represent objects that are transported using the embodiments described herein. In some aspects, the objects 46 may include components that allow the objects to be electronically detected, connected, identified, and/or tracked by other components of the system 30. For example, the objects 46 may include electronic features (e.g., electronic ID tags, RFID tags, wireless communication components, microchips, and the like) that can be detected by, or linked with, other components of the system 30, e.g., the object-detection component 44, and/or the computing device 38. This connectivity can facilitate identifying, routing, and tracking objects, in different aspects.

FIG. 3 also depicts a plurality of object-support structures 48, which are connected to the network 31. The object-support structures 48 may be coupled to the shifting mechanism 40, and in addition, may be movable relative to the object-shifting apparatus 32 to facilitate transfer of objects to/from the object-support structures 48. The object-support structures 48 may be adapted to receive, support, hold, and/or release objects, and/or may even be configured to shift objects. For example, in the latter aspect, the object-support structures 48 may include different components and/or mechanisms (e.g., conveyors, elevators, or other mechanisms) that are configured to translate or move objects stored thereon, to facilitate shifting and transferring the objects. The plurality of object-support structures 48 may be connected to, and/or directed by, a computing device.

FIG. 3 also depicts a user device 49, which is connected to the network 31. The user device 49 may be configured to receive inputs, display data, and provide feedback, and may be used, in one aspect, to direct operation of the system 30 and/or the components thereof. The user device 49 may also store or provide updates as objects are shifted, and display the associated updates (e.g., on a screen). For example, the user device 49 may include a graphical user interface ("GUI"), communication components, and/or a processor, memory, and/or an operating system that operates in connection with a system for shifting objects. The user device 49 may be portable, and may be integrated into a mobile transport, in different aspects.

Figure 4:
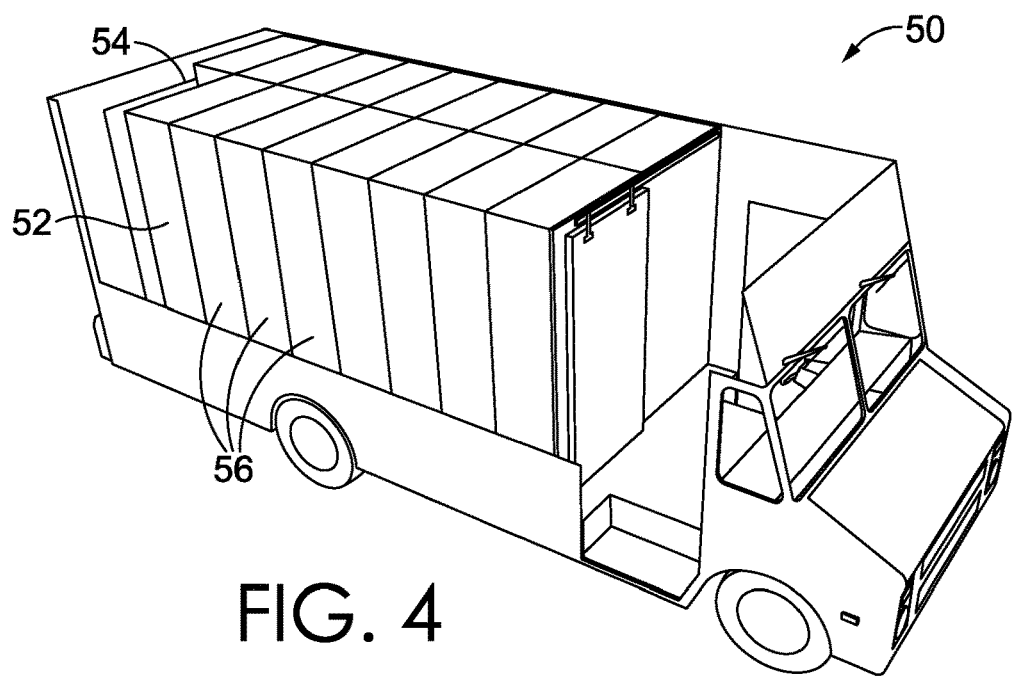
FIGS. 4-5 depict a mobile transport with an object-shifting system integrated therein, in accordance with an embodiment hereof.
Figure 5:
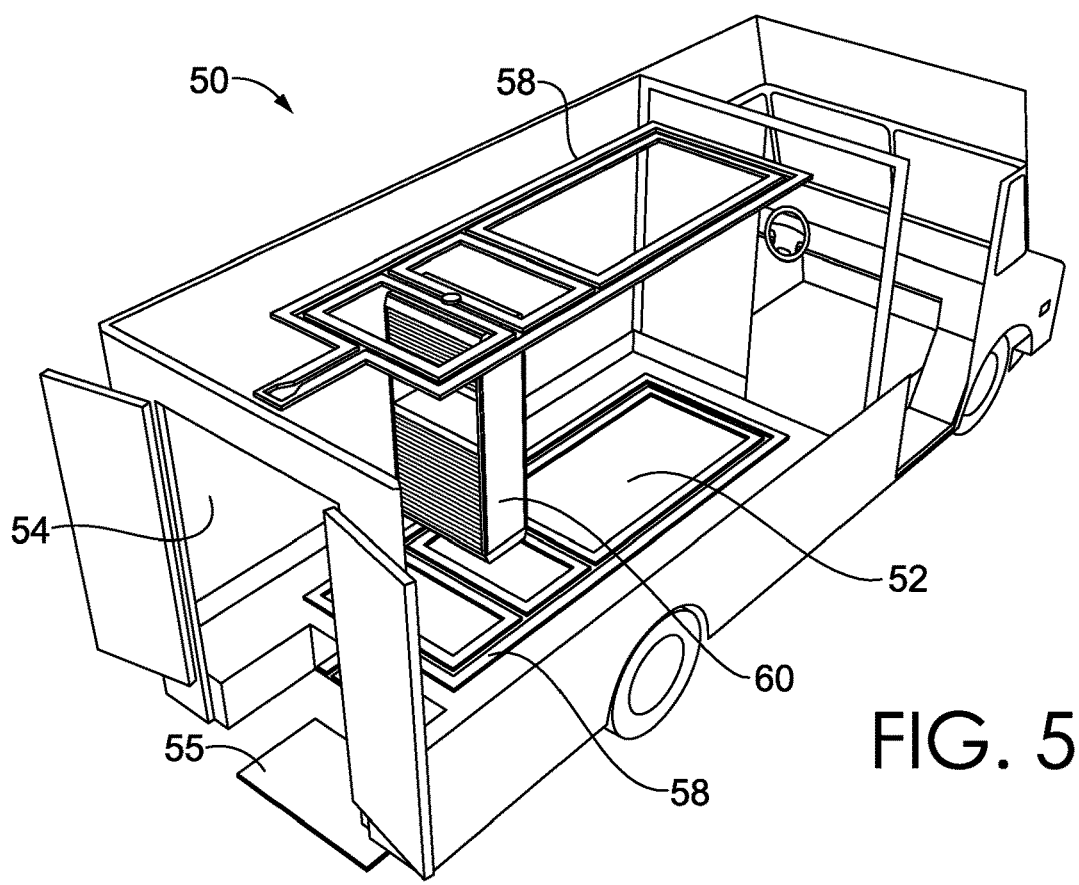

Referring now to FIGS. 4-5, a mobile transport 50 is provided, in accordance with an embodiment hereof. The mobile transport 50 is depicted as a vehicle. However, in other embodiments, different types of mobile transports may be used along with a system for shifting objects in automated or semi-automated fashion, as described herein. For example, a tractor-trailer, railway transport, ship, or aircraft may also be used in other aspects.

Looking at FIGS. 4-5, the mobile transport 50 has an object-shifting system 52 integrated therein. The object-shifting system 52 may include any of the capabilities described in connection with FIGS. 2-3. The object-shifting system 52 in particular is located in a storage space 54 of the mobile transport 50, and is configured to identify, engage, and/or shift objects in the storage space 54 in automated or semi-automated fashion, including while the mobile transport 50 is in transit between different locations.

The object-shifting system 52 includes a plurality of object-support structures 56 that are located in the storage space 54. The object-support structures 56 are adapted to support and/or hold objects that are being transported. The object-support structures 56 are coupled to a shifting mechanism 58 that is also located in the storage space 54. The shifting mechanism 58 is adapted to shift the object-support structures 56 to different locations in the storage space 54. The object-shifting system 52 also includes an object-shifting apparatus 60 that is located in the storage space 54. The object-shifting apparatus 60 may operate from a fixed position, or may be coupled to the shifting mechanism 58 and may be movable about the space 54, in different aspects. The object-shifting apparatus 60 is configured to shift objects between the object-support structures 56, including while the mobile transport 50 is in transit. This allows objects to be reorganized, or sorted, in the storage space 54, in automated or semi-automated fashion, in accordance with the designated destinations of the objects, while the objects are in-transit from one location to another. The object-shifting system 52 may be directed, at least in part, by a computing device or system, which may be integrated with the mobile transport 50 and/or which may be remote from the mobile transport 50, or local in-part and remote in-part. The mobile transport 50 further includes a loading mechanism 55 that may be used for loading the object-support structures 56 into the storage space 54, and coupling the object-support structures 56 to the shifting mechanism 58. The loading mechanism 55 may operate automatically or semi-automatically, in different aspects.

To illustrate one example operation of the system 52, the following non-limiting process is described. Initially, the mobile transport 50 may travel to a first location. In one aspect, the first location is a location in a logistics network. The plurality of object-support structures 56, with objects loaded thereon, may then be loaded into the mobile transport 50 at the first location. The object-support structures 56 may then be coupled to the shifting mechanism 58, e.g., through operation of the loading mechanism 55. The object-support structures 56 may then be shifted in the storage space 54 using the shifting mechanism 58, e.g., at the direction of a computing device. The mobile transport 50 may then travel to a second location, e.g., in a logistics network. During transit, the shifting mechanism 58 may reposition the object-support structures 56 in the storage space 54, so that a particular object-support structure is located adjacent to the object-shifting apparatus 60. The object-shifting apparatus 60 may then use one or more object-detection components to detect, locate, and/or identify an object on the adjacent object-support structure. Next, the object-shifting system 52 may identify another object-support structure that is associated with the designated destination of the identified object. The shifting mechanism 58 may then shift the other identified object-support structure to a location adjacent to the object-shifting apparatus 60, so that both object-support structures are located in a three-dimensional space in which the object-shifting apparatus 60 operates. Next, the object-shifting apparatus 60 may engage and transfer the object onto the object-support structure associated with the designated destination. This process may be repeated with different object-support structures 56, thereby allowing the objects on the object-support structures 56 to be sorted, and re-organized, in automated or semi-automated fashion, while the mobile transport 50 is traveling. This may allow objects to be sorted with greater speed, and efficiency, in a period of time where the objects would traditionally not be sorted or organized.

Figure 6:
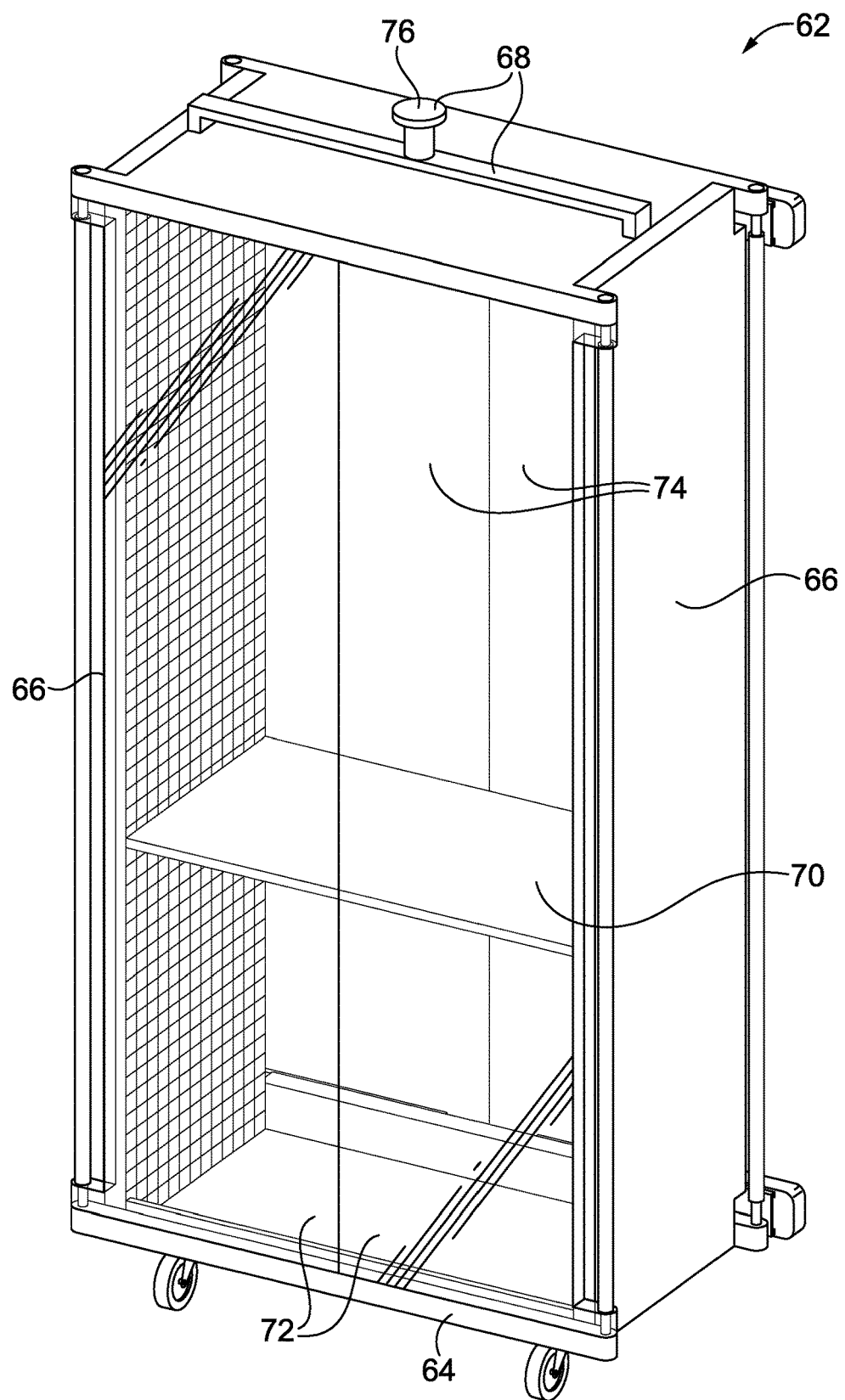
FIG. 6 depicts one example of an object-support structure, in accordance with an embodiment hereof.
Figure 7:
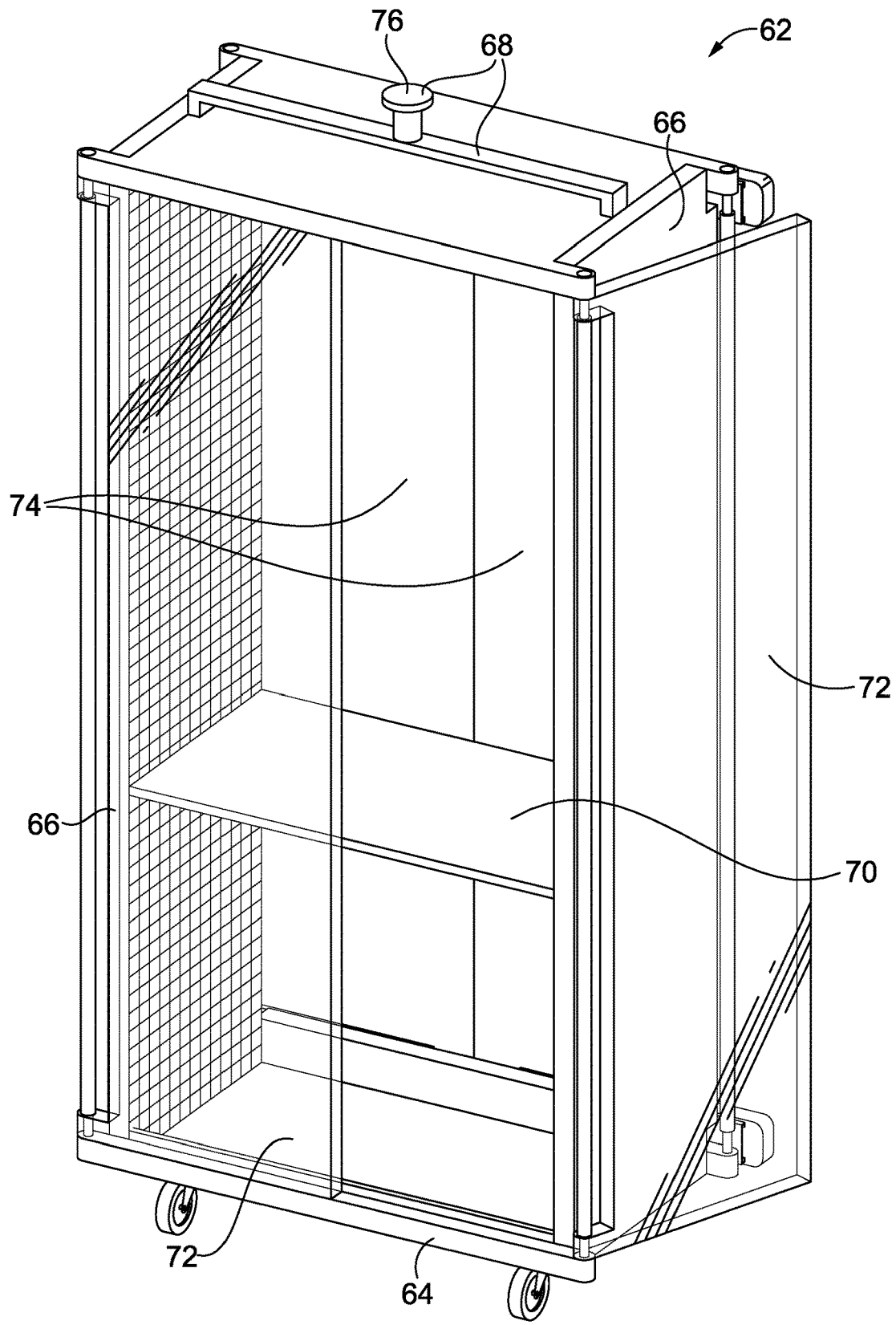
FIG. 7 depicts the object-support structure of FIG. 6 in a configuration suitable for loading/unloading, in accordance with an embodiment hereof.

Referring now to FIGS. 6-7, an object-support structure 62 is provided, in accordance with an embodiment hereof. The object-support structure 62 is intended to represent one non-limiting example of the object-support structures described herein, and accordingly, numerous other variations having different sizes, shapes, configurations, and/or features are contemplated. The object-support structure 62 shown in FIGS. 6-7 is configured to support objects during transport to different destinations. The object-support structure 62 is also designed to be coupled to, and repositioned by, a shifting mechanism, as described with respect to FIG. 2. The object-support structure 62 is also designed to be manipulated by an object-shifting apparatus, as described with respect to FIG. 2.

The object-support structure 62 includes a wheeled-base 64, a frame 66, a track-engaging structure 68, a set of doors 72, and a set of doors 74. The wheeled-base 64 includes wheels that can roll along a surface. This allows a shifting mechanism coupled to the object-support structure 62, e.g., at the track-engaging structure 68, to impart movement to the object-support structure 62, causing the wheeled-base 64 to roll along a surface. In another aspect, instead of, or in addition to, wheels, the base may include a coupling structure, e.g., similar to the track-engaging structure 68, that allows the base to be coupled to, and movable along, a track or rail system that forms part of a shifting mechanism.

The object-support structure 62 includes, for example purposes, a shelf 70 that can be used to support objects. In other aspects, different object-supporting features, such as baskets, hooks, cages, and the like, may be used, in addition to, or in place of, the shelf 70. The interior of the object-support structure 62 may be designed to support a plurality of such features, and may be reconfigurable, so that object-supporting and/or object-holding features used with the object-support structure 62 can be removed and/or replaced. These features may also be coupled to mechanisms that can re-position the features in the interior of the object-support structure 62.

The doors 72 and/or doors 74 of the object-support structure 62 may be configured to be opened and closed in automated or semi-automated fashion using a door-engaging mechanism, e.g., one located on an object-shifting apparatus. The doors 72 and/or doors 74 may thus include features or structures that support this automated manipulation. For example, the doors 72 and/or doors 74 may include protrusions, recesses, couplings, mechanisms, and/or other features that can be engaged by a mechanical mechanism that opens and closes the doors 72 and/or doors 74.

The track-engaging structure 68 located on the object-support structure 62 includes a protrusion 76. The protrusion 76 may be sized, shaped, and located on the object-support structure 62 so that it can engage part of a shifting mechanism, e.g., a guide track/rail system, thereby allowing the shifting mechanism to guide, and impart movement to, the object-support structure 62 during a shifting process. In other aspects, different features may be implemented on the object-support structure 62 to allow it to be coupled to a shifting mechanism.

Figure 8:
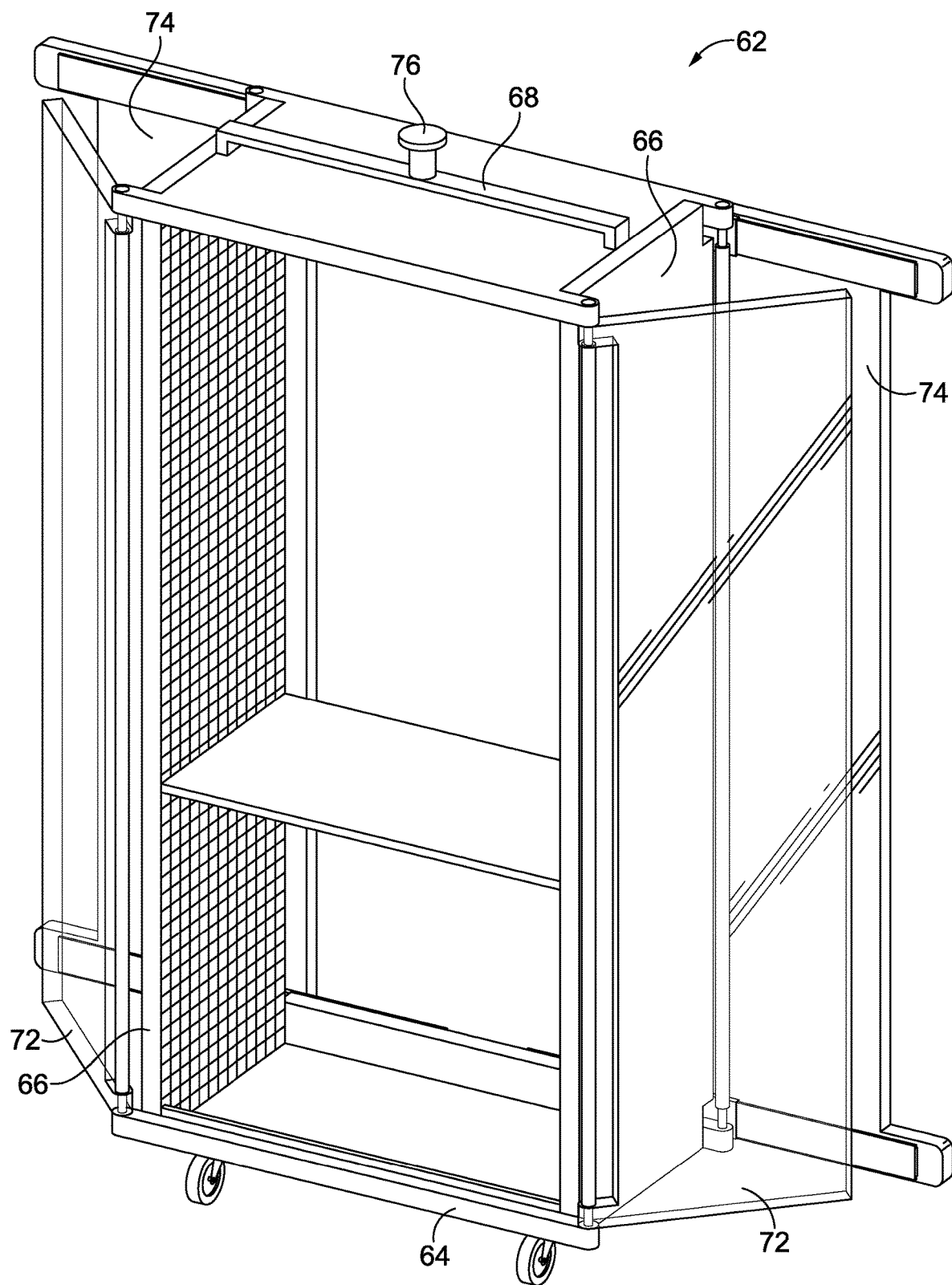
FIG. 8 depicts the object-support structure of FIG. 6 in another configuration suitable for loading/unloading, in accordance with an embodiment hereof.

Referring now to FIG. 8, the object-support structure 62 of FIG. 7, shown in a configuration suitable for loading and/or unloading, is provided, in accordance with an embodiment hereof. FIG. 8 in particular shows the object-support structure 62 with the doors 72 and the doors 74 opened to provide access to the interior of the object-support structure 62. The doors 72 and/or the doors 74, as discussed above, may be configured for automated manipulation by a door-engaging mechanism, a non-limiting example of which is depicted in FIG. 13B. The doors 72 of the object-support structure 62 are pivotally coupled to the frame 66, as shown in FIG. 8. The doors 74 of the object-support structure 62 are slidably coupled to the frame 66, as shown in FIG. 8. In other embodiments, object-engaging structures may include different doors, or different combinations thereof. For example, two opposed sets of sliding doors may be used, two opposed sets of pivoting doors may be used, only one set of doors may be used, or no sets of doors may be used, and the object-support structure 62 may simply be open on one or more sides to allow access to the interior, in different aspects. Accordingly, numerous different configurations are possible without departing from the scope of the present disclosure.

Figure 9:
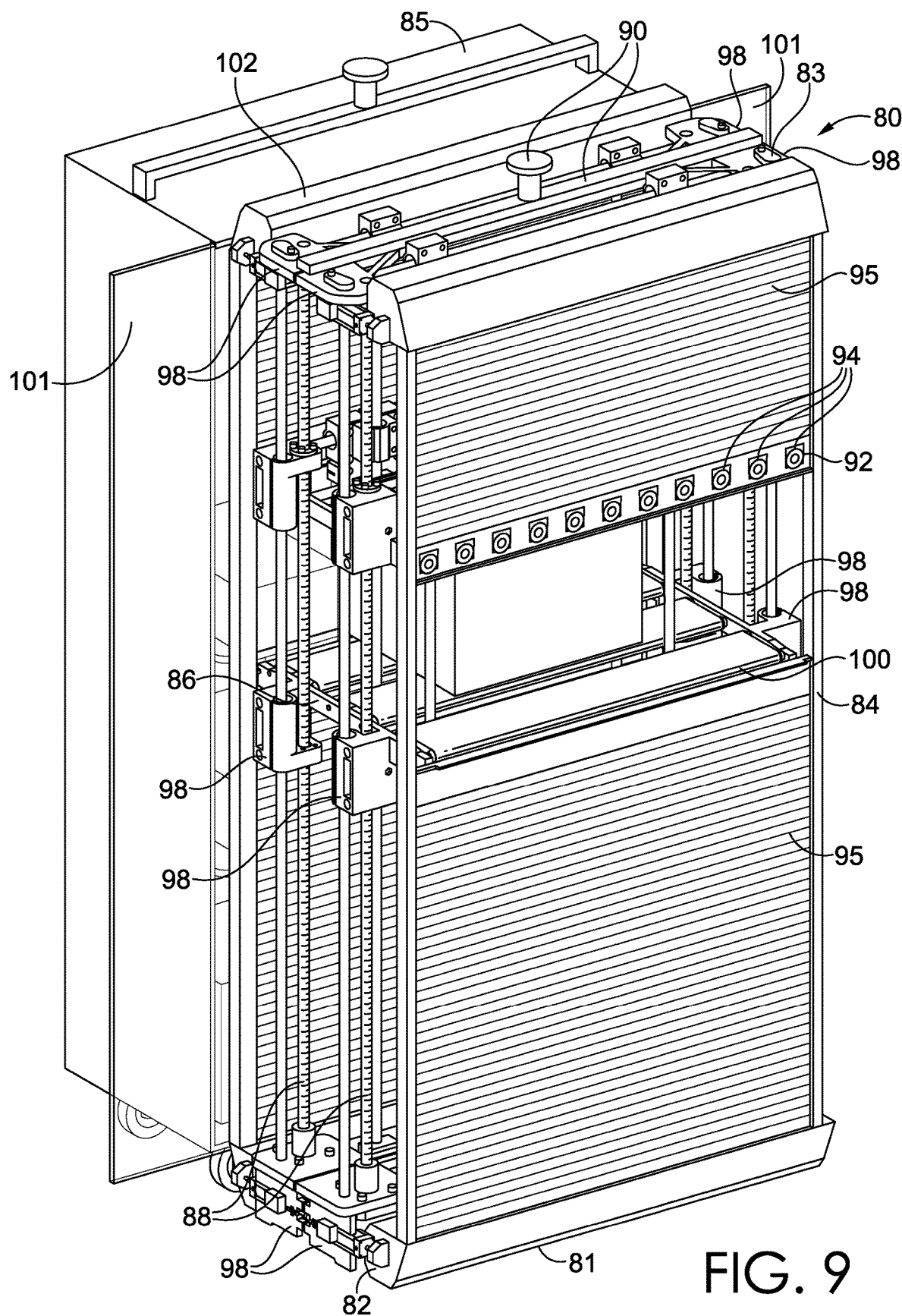
FIGS. 9-10 depict an object-shifting apparatus and an object-support structure, in accordance with an embodiment hereof.

Referring now to FIG. 9, an object-shifting apparatus 80 and an object-support structure 85 are shown, in accordance with an embodiment hereof. The object-shifting apparatus 80 is configured to engage, and interact with, the object-support structure 85 in automated or semi-automated fashion. The object-shifting apparatus 80 is further configured to identify, locate, and engage objects positioned on the object-support structure 85, and/or shift objects to/from the object-support structure 85 in automated or semi-automated fashion during this interaction. The object-shifting apparatus 80 includes multiple components that enable this functionality, as described in detail below.

The object-shifting apparatus 80 includes a base 82, a frame 84, and an object-shifting mechanism 86, which is movable along the frame 84. The object-shifting apparatus 80 also includes a track 88. The track 88 extends between a first end 81 and a second end 83 of the frame 84. The object-shifting mechanism 86 is coupled to, and movable along, the track 88. This movement is enabled by shifting components 98 that are coupled to the object-shifting mechanism 86 and to the track 88. The shifting components 98 may include actuators, guides, control elements, and the like, that operate to shift the object-shifting mechanism 86 along the track 88. Accordingly, in different aspects, the shifting components 98 may be mechanical (e.g., a worm-drive or gear-based system), electrical (e.g., operated using solenoids), hydraulic, and/or pneumatic, or a combination of any of the aforementioned aspects. The shifting components 98, like the object-shifting apparatus 80, may also be directed by a computing device that is local and/or remote to the object-shifting apparatus 80.

The object-shifting apparatus 80 also includes a door-engaging mechanism 102. The door-engaging mechanism 102 is configured to engage, open, and close a set of doors 101 located on the object-support structure 85. The door-engaging mechanism 102 may include different features that support this functionality. For example, the door-engaging mechanism 102 may include protrusions, recesses, coupling elements, mechanisms, actuators, aligning elements, computer-vision elements, and/or other elements, which may operate in coordination to engage, open, and close the doors 101 of the object-support structure 85 shown in FIG. 9.

The object-shifting apparatus 80 also includes a track-engaging structure 90. In one aspect, the track-engaging structure 90 may be coupled to a guide track of a shifting mechanism, e.g., as described in connection with FIG. 2. Through this connection, the shifting mechanism can operate to shift the object-shifting apparatus 80 about a space to facilitate the shifting of objects. In a different aspect, the object-shifting apparatus 80 may not be coupled to a shifting mechanism, and may instead operate from a fixed position. In yet another aspect, the object-shifting apparatus 80 and other object-support structures used to transport objects may all be coupled to a shifting mechanism, allowing each of these structures to be shifted in a space, for maximum adaptability in relative positioning.

The object-shifting apparatus 80 includes an object-detection component 92. The object-detection component 92 may in actuality be a combination of components that operate together to perform the detection processes described herein. In FIG. 9, one element of the object-detection component 92, i.e., a set of sensors 94, is identified. However, the object-detection component 92 may include other elements, such as computing components, communication components, illumination components, and the like, which are not explicitly depicted in FIG. 9. These other elements of the object-detection component 92 may be local to the object-shifting apparatus 80, and/or may be remote to the object-shifting apparatus 80, or both, in different aspects.

The object-detection component 92 may be used to identify an object (e.g., based on a unique identifier associated with the object), and/or locate an object (e.g., in a three-dimensional geometric coordinate system), and/or determine characteristics of an object (e.g., dimensions, orientation, physical features, and the like), as described herein. The object-detection component 92, and/or elements thereof, may be coupled to the object-shifting mechanism 86, thereby allowing it to shift with the object-shifting mechanism 86 on the frame 84, allowing it to perform detection processes in areas adjacent to the object-shifting mechanism 86. FIG. 9 shows also that the sensors 94 of the object-detection component 92 are coupled to a shutter 95. The shutter 95 moves with the object-shifting mechanism 86 and the sensors 94, and may be used to limit the field of view of the object-detection component 92. This reduces interference from objects and structures not targeted for detection. The shutter 95 may also be used to limit or restrict other objects on the object-support structure 85 from interfering with the operation of the object-shifting apparatus 80, e.g., by restricting or limiting objects from sliding or falling, and/or by restricting or limiting objects from being shifted off of the object-support structure 85, e.g., by blocking them. The object-shifting mechanism 86 also includes a conveyor 100, which may or may not be used in different aspects. The conveyor 100 supports the shifting of objects laterally across the object-shifting mechanism 86, i.e., perpendicular to a length of the frame 84 extending between the first end 81 and the second end 83.

Figure 10:
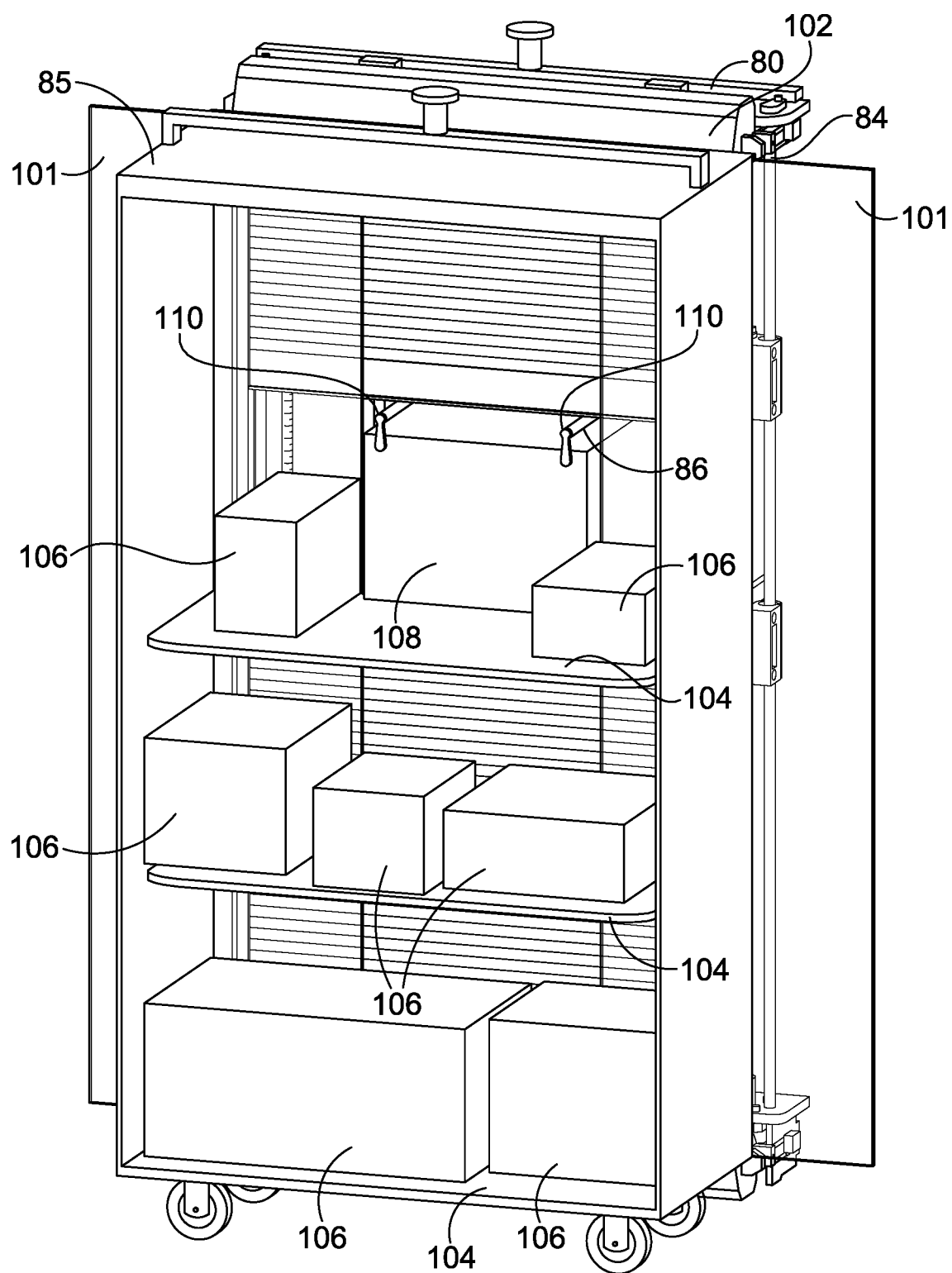

Referring now to FIG. 10, the object-shifting apparatus 80 and the object-support structure 85 are again shown from a different perspective, in accordance with an embodiment hereof. FIG. 10 depicts the object-support structure 85 having a plurality of support elements 104 on which a plurality of objects 106 are positioned. The doors 101 of the object-support structure 85 are also shown in an open configuration. In this respect, the doors 101 are movable, and in this example, slidable, between a closed configuration and an open configuration. The movement of the doors 101 is imparted by a door-engaging mechanism 102 located on the object-shifting apparatus 80.

FIG. 10 shows how the object-shifting apparatus 80 is able to interact with the object-support structure 85 in automated or semi-automated fashion. To illustrate an example, the object-support structure 85 is first located, e.g., by a shifting mechanism, in a three-dimensional space in which the object-shifting apparatus 80 operates. The door-engaging mechanism 102 then engages, e.g., couples to, the doors 101, and then actuates to open the doors 101. The object-shifting mechanism 86 is then shifted to a location on the frame 84 that is adjacent to an object, e.g., the object 108, located on the object-support structure 85. The object-detection component 92 can then identify, locate, and/or determine characteristics of the object 108 located on the object-support structure 85. For example, in one instance, the object-detection component 92 may identify the object 108 based on a unique identifier associated with the object 108, as described herein. The unique identifier may be used to determine the object 108's origin, destination, contents, associated sender, associated recipient, size, weight, shape, routing schedule or history, and/or other information.

The object-detection component 92 may locate the object 108 in the three-dimensional space in which the object-shifting apparatus 80 and/or the object-shifting mechanism 86 operates. For example, the object-detection component 92 may identify one or more geometric coordinates in a three-dimensional geometric coordinate system that are associated with the object 108. These geometric coordinates may be used to identify boundaries (e.g., edges, corners, surfaces) of the object 108, and/or may be used to determine depth values of the object 108 relative to a reference system. This information may subsequently be used by the object-shifting mechanism 86 to dynamically locate, and engage, the object 108. Therefore, even when objects are randomly positioned on the object-support structure 85, with their locations unknown, the objects can still be located, engaged, and then shifted by the object-shifting apparatus 80 in automated or semi-automated fashion.

In another instance, the object-detection component 92 may be used to determine characteristics of the object 108 (e.g., dimensions, boundaries, orientations, reference points, etc.). For example, using the detection processes described herein, the object-detection component 92 may be able to determine dimensions of the object 108, e.g., an object's height, width, and/or depth, an object's shape, e.g., square, round, rectangular, asymmetric, etc., or identifiable reference points on the object, e.g., points where the object-shifting mechanism 86 can engage and hold/brace the object. In addition, the object's orientation in a three-dimensional space may be determined and used. For example, a degree of rotation of the object 108 may be determined, e.g., in a three-dimensional geometric coordinate system, thereby allowing the object-shifting mechanism 86 to engage the object 108 at the correct orientation. In addition, in some instances, an identification process may be performed on the object 108, e.g., when the object 108 is shifted in automated or semi-automated fashion in accordance with its determined identity and/or its determined destination. In other instances, an identification process may not be performed, and instead only locating and shifting of the object 108 may be performed in automated or semi-automated fashion, where determination of the identity is not needed or desired. In either case, the object 108, once detected, located, and/or identified if applicable, is then engaged by components of the object-shifting mechanism 86, and shifted, as described further with respect to FIG. 11.

Figure 11:
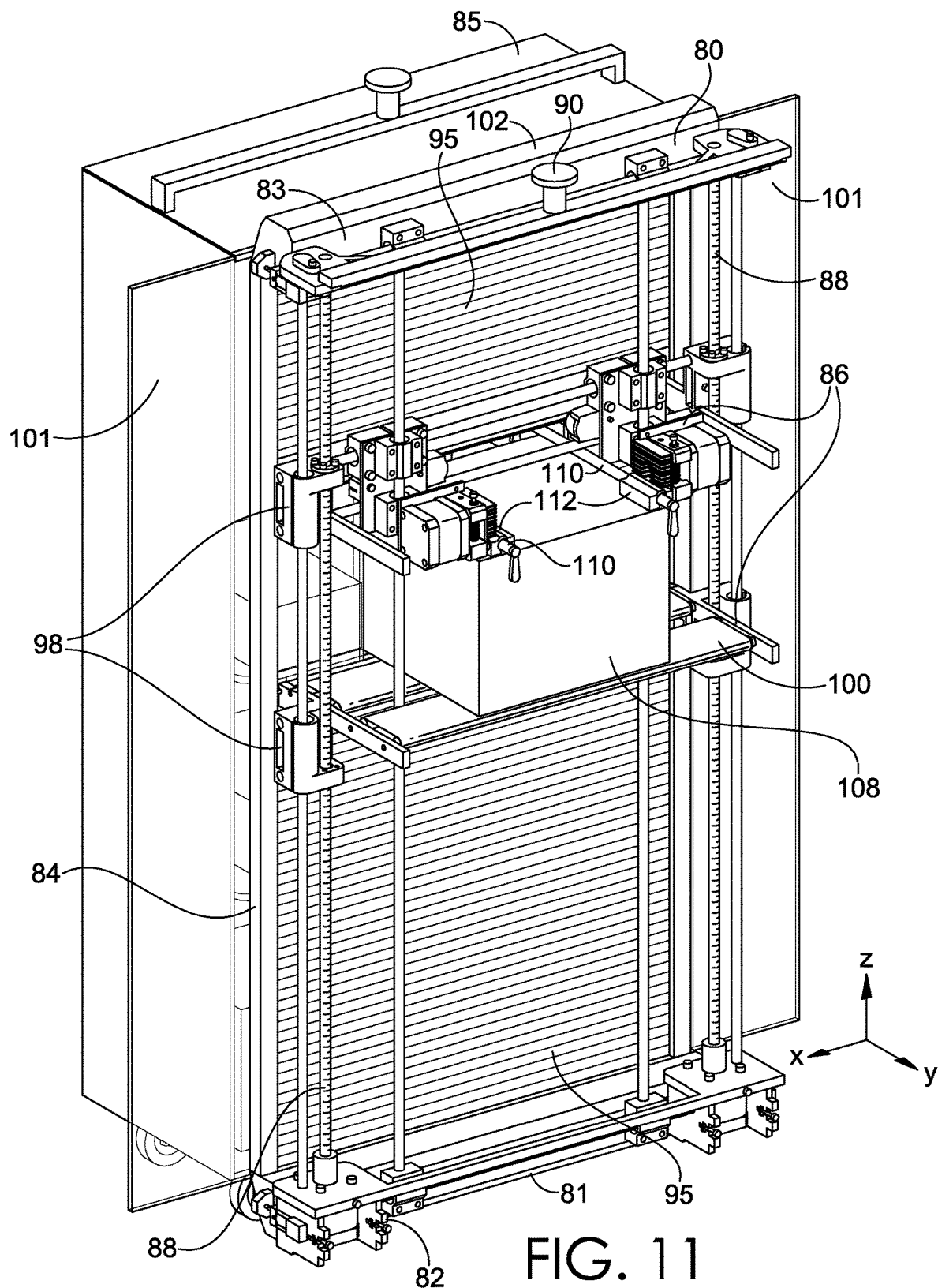
FIG. 11 depicts part of the object-shifting apparatus shown in FIG. 9, in accordance with an embodiment hereof.

Referring now to FIG. 11, the object-support structure 85 and part of the object-shifting apparatus 80 are shown, in accordance with an embodiment hereof. FIG. 11 shows the object-shifting apparatus 80 adjacent to, and engaged with, the object-support structure 85. In particular, the door-engaging mechanism 102 of the object-shifting apparatus 80 is engaging, and holding open, the doors 101 of the object-support structure 85, allowing access to the interior of the object-support structure 85.

FIG. 11 also shows the object-shifting mechanism 86 in more detail, through omission of one side of the object-shifting apparatus 80. The object-shifting mechanism 86, as shown in FIG. 11, is translatable in at least the z-direction, as referenced in FIG. 11. However, in other embodiments, the object-shifting mechanism 86 and shifting components 98 may be configured so that the object-shifting mechanism 86 is shiftable in the x-direction, the y-direction, the z-direction, or any combination thereof. Having the ability to translate in the x, y, and/or z-direction may allow for greater flexibility when engaging objects supported on different parts of the object-support structure 85. For example, translation in the x-direction may assist with detecting and engaging objects positioned across a width of the object-support structure 85.

The object-shifting mechanism 86 includes a pair of movable object-engaging components 110. The object-engaging components 110 are coupled to actuators 112 that are configured to translate the object-engaging components 110 into different positions and/or orientations. This allows them to engage (e.g., brace, grasp, support, etc.) and shift (e.g., push, pull, or otherwise translate) objects, e.g., in order to transfer them from one object-support structure onto the object-shifting mechanism 86 and/or onto another object-support structure. In different aspects, the object-engaging components 110 may be extendable, retractable, pivotal, translatable, and/or otherwise movable in different directions to allow them to adaptively, or dynamically, engage and shift objects having a range of different dimensions. The object-shifting mechanism 86 also includes the conveyor 100, which may assist with shifting objects, e.g., as shown with the object 108. As noted above, the conveyor 100 may or may not be used, in different aspects.

Figure 12:
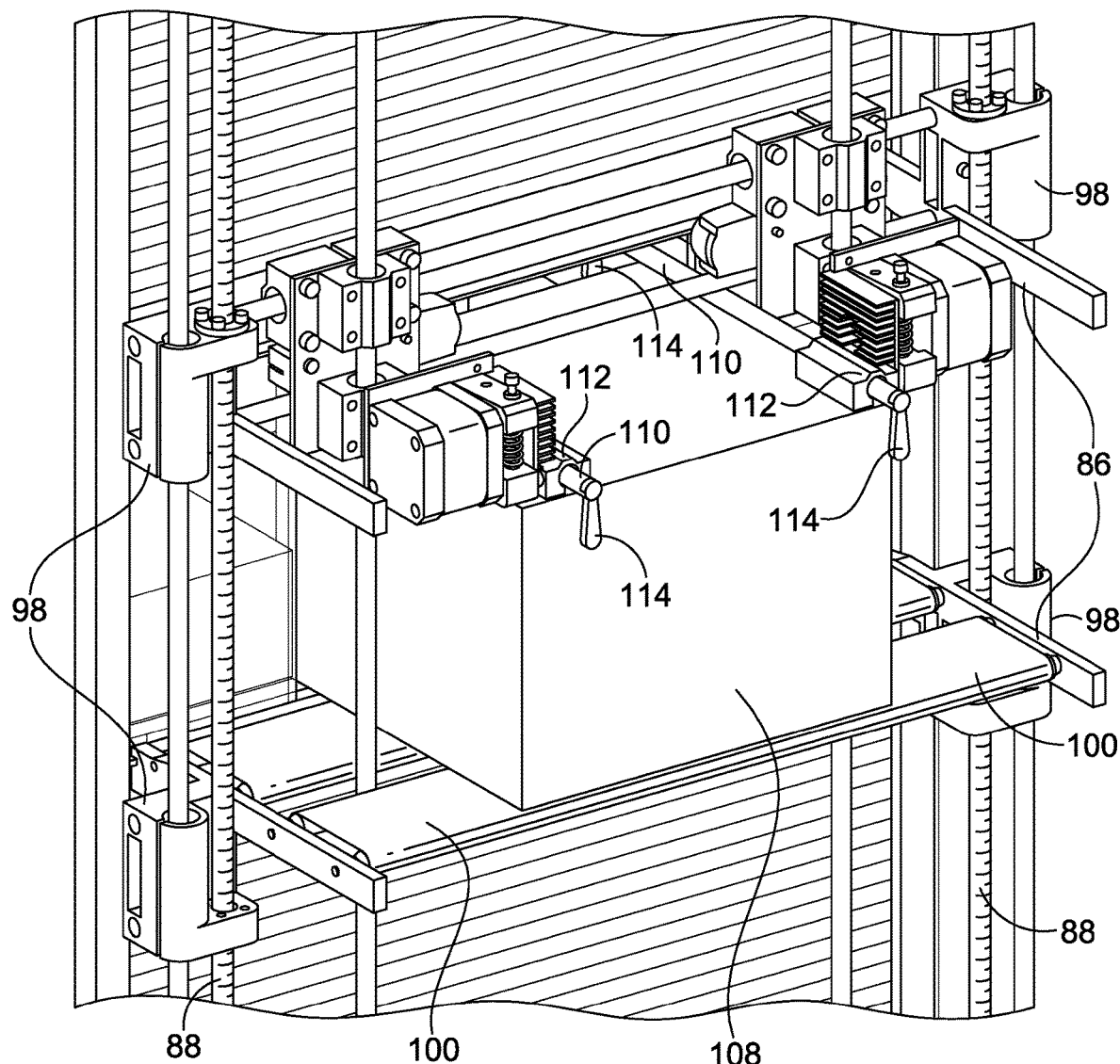
FIG. 12 depicts an enhanced view of the object-shifting apparatus of FIG. 11, in accordance with an embodiment hereof.

Referring now to FIG. 12, the object-shifting mechanism 86 of FIGS. 10-11, enlarged to depict additional detail, is shown, in accordance with an embodiment hereof. FIG. 12 depicts the different components of the object-shifting mechanism 86, including the shifting components 98, the object-engaging components 110, the actuators 112, and the conveyor 100, in addition to other features. The actuators 112 may be operable to extend and retract the respectively coupled object-engaging components 110. The actuators 112 may be operable to rotate/pivot the respectively coupled object-engaging components 110, thereby causing their respective object-engaging distal ends 114 to move into/out of position for engaging objects. The actuators 112 may be operable to translate, e.g., shift in one or more directions, the respectively coupled object-engaging components 110, and/or their respective object-engaging distal ends 114, to facilitate engaging an object. The object-engaging components 110, and/or actuators 112 coupled thereto, may also include contact sensors and/or pressure sensors that are used to detect when the object-engaging components 110 are in contact with an object, and/or when the object-engaging components 110 have applied sufficient force against an object to hold it during transfer. The object-shifting mechanism 86 may also include a lighting element (e.g., light emitting diodes (LEDs), light bulbs, flash elements, etc.) that operates in conjunction with the object-detection component 92 to provide illumination of objects during detection.

FIGS. 13A-13B depict a door assembly 125 and a door-engaging mechanism 127, in accordance with embodiments hereof. The door assembly 125 may form part of an object-support structure, such as the object-support structure 85 shown in FIG. 9. The door assembly 125 includes a set of sliding doors 129. The sliding doors 129 are coupled to a slider-mechanism 131, which allows the doors 129 to slide between a closed configuration and an open configuration and any position in between that provides a gap. The door assembly 125 further includes engaging features 133 that correspond to engaging features 135 located on the door-engaging mechanism 127 shown in FIG. 13B. The engaging features 133, 135 are represented, for example purposes, as male-female type engaging features (e.g., protrusions in one structure, and corresponding recesses in the other structure). However, in other aspects, hooks/loops, latches, mechanical couplings, and/or other structures or mechanisms suitable for coupling the elements together may be used in place of the engaging features 133, 135 shown in FIGS. 13A-13B.

FIG. 13B depicts the door-engaging mechanism 127. The door-engaging mechanism 127 is configured to engage, open, and/or close the doors 129 located on the corresponding door assembly 125. To enable this, the door-engaging mechanism 127 includes a pair of door-actuators 137, which are coupled to engaging features 135. The door-actuators 137 are operable to translate the engaging features 135 towards or apart from each other, thereby allowing them, when engaged with the corresponding engaging features 133 on the door assembly 125, to translate the doors 129 between a closed configuration and an open configuration. The engaging features 135 may be fixed, or may be extendable/retractable to assist with contacting the engaging features 133 located on the slider-mechanism 131.

Figure 14A:
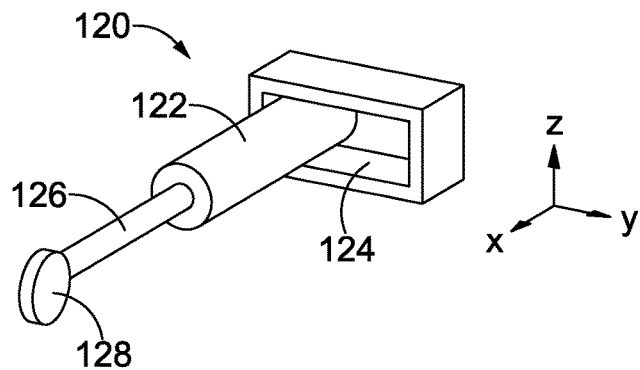
FIGS. 14A-14D depict different object-engaging components, in accordance with embodiments hereof.

Referring now to FIGS. 14A-14D, a plurality of object-engaging components 120, 130, 138, 146 are provided, in accordance with embodiments hereof. FIG. 14A depicts an object-engaging component 120, which includes an actuator 122, an actuator 124, an object-engaging element 126, and a distal end 128 used for contacting, and bracing against, an object that is being shifted. The actuator 122 allows the distal end 128 to translate in the x-direction, as represented in FIG. 14A. The actuator 124 allows the distal end 128 to translate in the y-direction, as represented in FIG. 14A. The distal end 128, while depicted in one particular shape, may have different shapes in different aspects, and may include different features that support engaging and holding an object. For example, mechanical gripping elements, suction or vacuum elements, electro-static gripping elements, and/or adjustable support or holding elements are also contemplated for use with any of the embodiments shown in FIGS. 14A-14D.

Figure 14B:
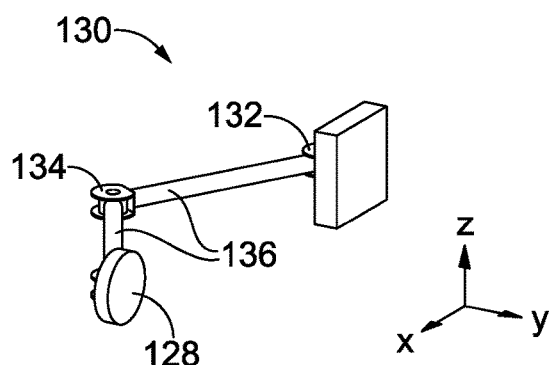

FIG. 14B depicts another object-engaging component 130 that includes an actuator 132, an actuator 134, an object-engaging element 136, and a distal end 128 used for contacting, and bracing against, an object that is being shifted. The actuator 132 and the actuator 134 allow the object-engaging element 136 to articulate in the x and y directions, as represented in FIG. 14B, thereby allowing the distal end 128 to contact, and brace against, an object. In different embodiments, the actuators 132, 134 may allow the object-engaging element 136 to translate in the x-direction, the y-direction, and/or the z-direction, depending on the configuration of the components, and desired adaptability.

Figure 14C:
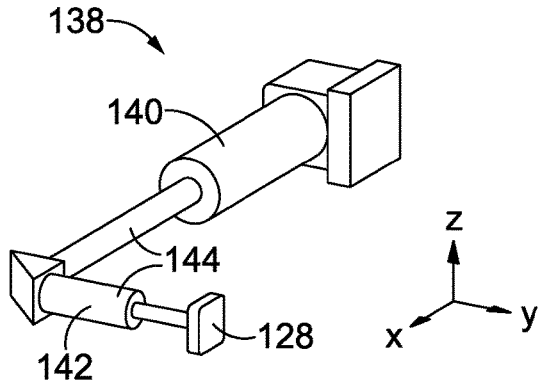

FIG. 14C depicts another object-engaging component 138 that includes an actuator 140, an actuator 142, an object-engaging element 144, and a distal end 128. The actuator 140 allows the object-engaging element 144 to translate (e.g., extend and retract) in the x-direction, as represented in FIG. 14C, and the actuator 142 allows the object-engaging element 144 to translate (e.g., extend and retract) in the y-direction, as represented in FIG. 14C. In another aspect, a further actuator may be provided that allows the object-engaging element 144 to translate in the z-direction, or a rotational actuator may be used to allow the object-engaging element 144 to pivot, among other possible configurations.

Figure 14D:
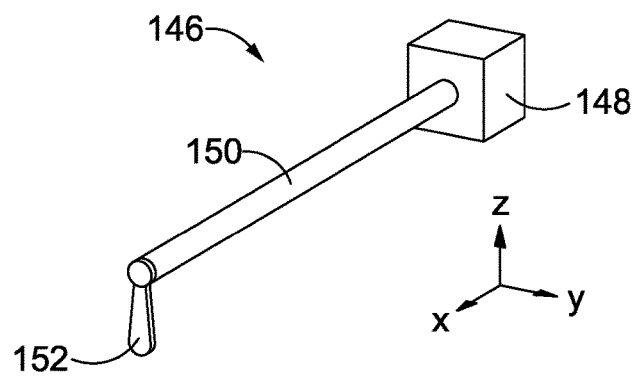

FIG. 14D depicts another object-engaging component 146 that includes an actuator 148, an object-engaging element 150, and a distal end 152. The actuator 148 shown in FIG. 14D is configured to translate (e.g., extend and retract) the object-engaging element 150 in the x-direction, and is also configured to pivot or rotate the object-engaging element 150 and by association the distal end 152 about the x-axis, as represented in FIG. 14D. The pivoting of the distal end 152 allows the distal end 152 to be rotated into a position that allows the actuator 148 to translate, e.g., extend or retract, the object-engaging element 150 to thereby shift an object. The object-engaging components 120, 130, 138, 146 allow for different types of actuation and translation, thereby allowing them to shift objects through automated or semi-automated operation, as described herein. It should be understood that any of the features shown in FIGS. 14A-14D may be used in any combination to provide the desired adaptability for engaging objects.

Figure 15:
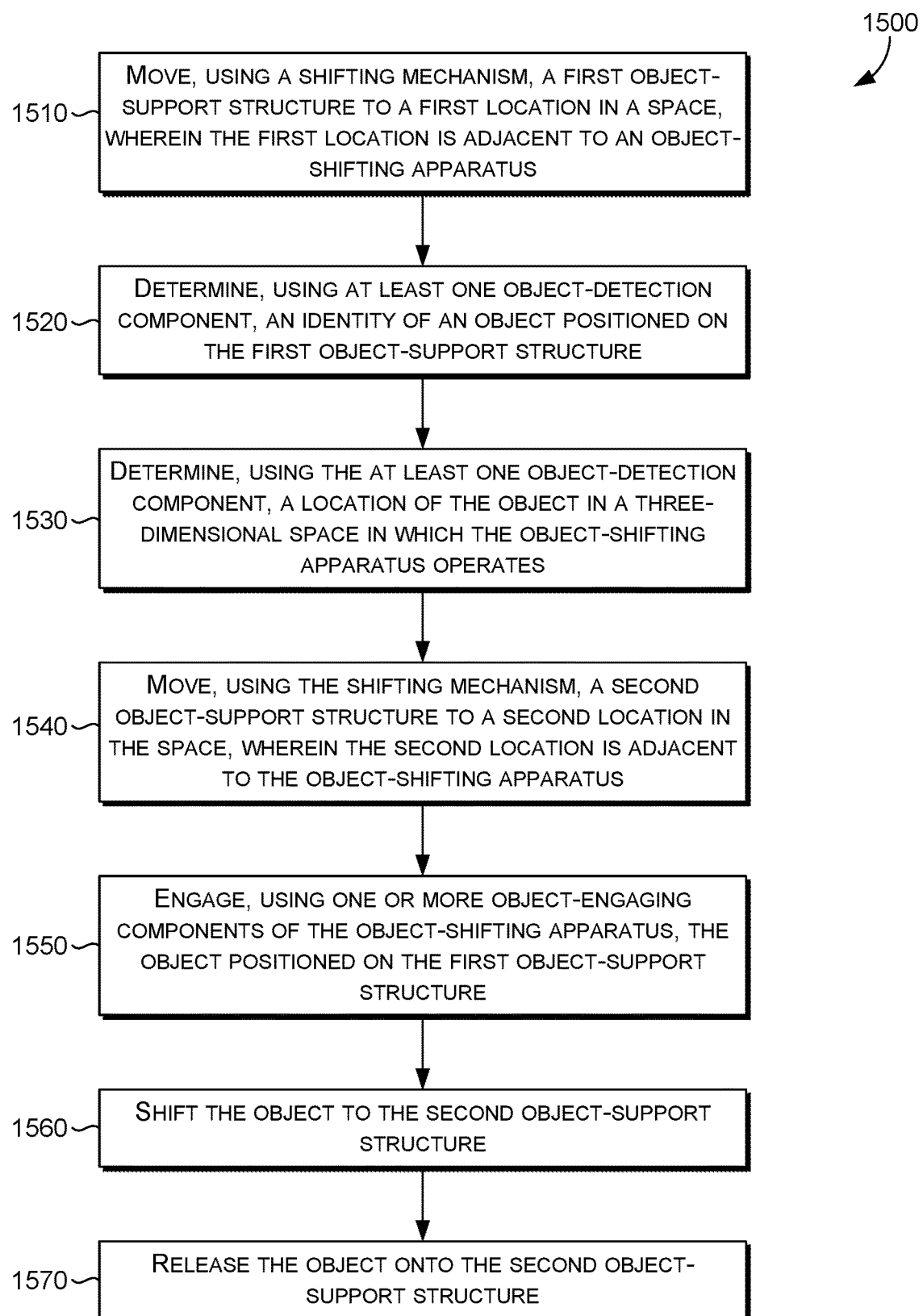
FIG. 15 depicts a block diagram of a method for shifting objects, in accordance with an embodiment hereof.

Referring now to FIG. 15, a block diagram of an example method 1500 for shifting objects is provided, in accordance with an embodiment hereof. The method 1500 is represented by blocks 1510-1570 in FIG. 15. In block 1510, the method includes moving, using a shifting mechanism, such as the shifting mechanism 26 provided in FIG. 2, a first object-support structure, such as the object-support structure 28 shown in FIG. 2, to a first location in a space, such as the space 24 shown in FIG. 2, wherein the first location is adjacent to an object-shifting apparatus, such as the object-shifting apparatus 22 shown in FIG. 2. In block 1520, the method includes determining, using at least one object-detection component, such as the object-detection component 25 shown in FIG. 2, an identity of an object positioned on the first object-support structure. In block 1530, the method includes determining, using the at least one object-detection component, a location of the object in a three-dimensional space in which the object-shifting apparatus operates. In block 1540, the method includes moving, using the shifting mechanism, a second object-support structure to a second location in the space, wherein the second location is adjacent to the object-shifting apparatus. In block 1550, the method includes engaging, using one or more object-engaging components, such as the object-engaging components 110 shown in FIG. 10, of the object-shifting apparatus, the object positioned on the first object-support structure. In block 1560, the method includes shifting the object to the second object-support structure. In block 1570, the method includes releasing the object onto the second object-support structure.

Figure 16:
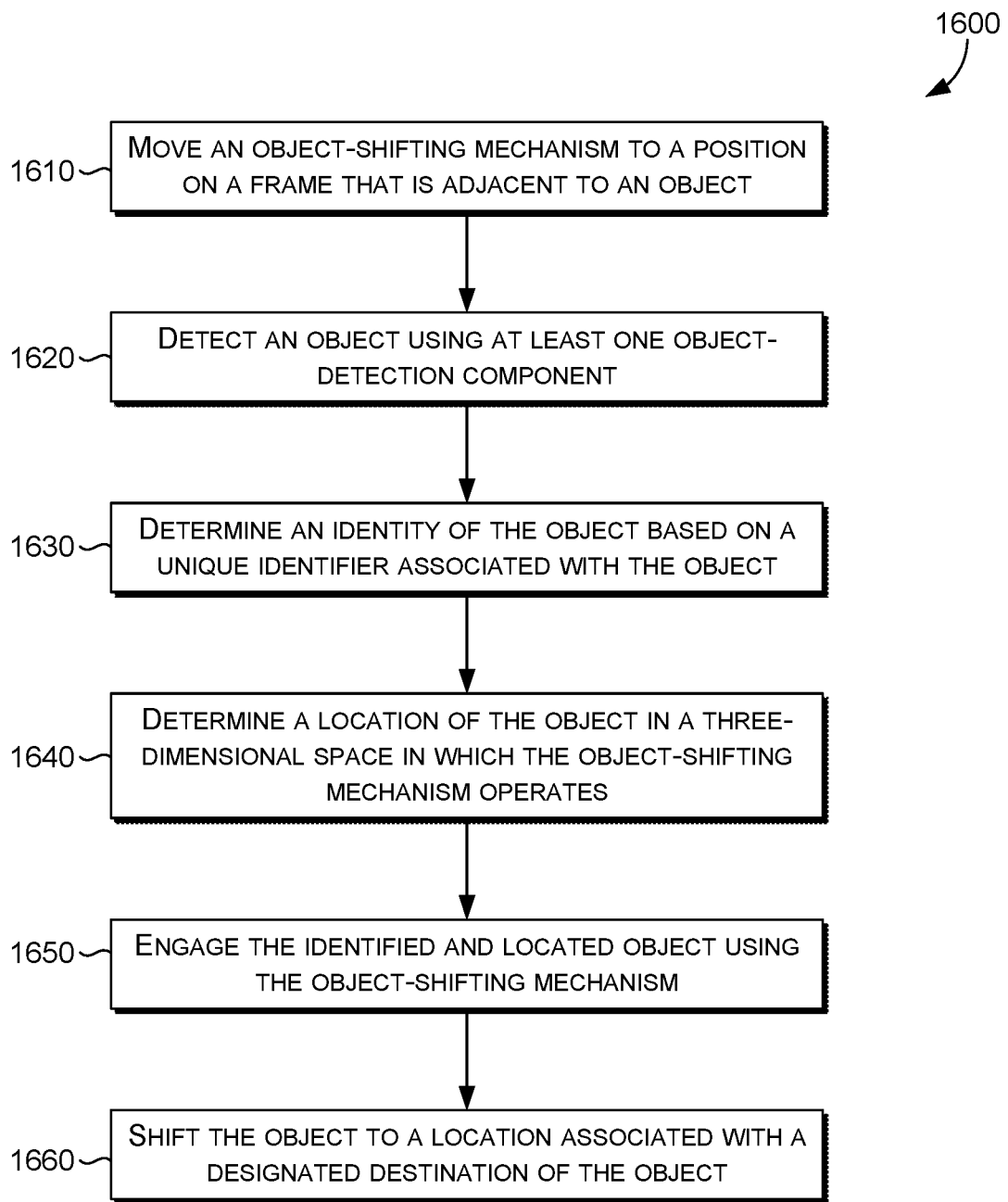
FIG. 16 depicts another block diagram of a method for shifting objects, in accordance with an embodiment hereof.

Referring now to FIG. 16, a block diagram of an example method 1600 of shifting objects is provided, in accordance with an embodiment hereof. The method 1600 is represented by blocks 1610-1660. In block 1610, the method includes moving an object-shifting mechanism, such as the object-shifting mechanism 27 shown in FIG. 2, to a position on a frame, such as the frame 84 shown in FIG. 9, that is adjacent to an object. In block 1620, the method includes detecting an object using at least one object-detection component, such as the object-detection component 25 shown in FIG. 2. In block 1630, the method includes determining an identity of the object based on a unique identifier associated with the object. In block 1640, the method includes determining a location of the object in a three-dimensional space in which the object-shifting mechanism operates. In block 1650, the method includes engaging the identified and located object using the object-shifting mechanism. In block 1660, the method includes shifting the object to a location associated with a designated destination of the object.

Figure 17:
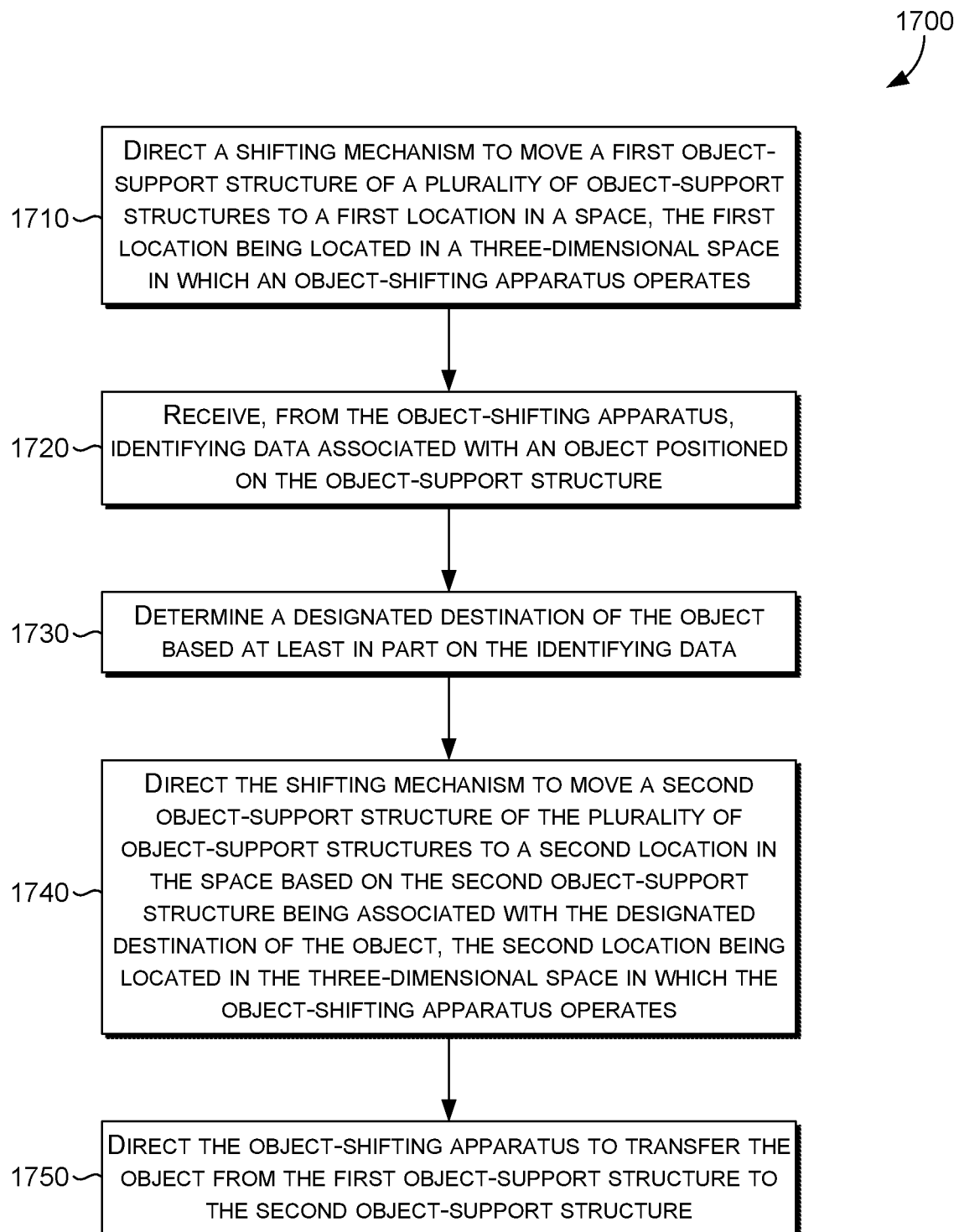
FIG. 17 depicts a block diagram of a method for directing the shifting of objects, in accordance with an embodiment hereof.

Referring now to FIG. 17, a block diagram of an example computer-implemented method 1700 for directing the shifting of objects is provided, in accordance with an embodiment hereof. The method 1700 is represented by blocks 1710-1750. In block 1710, the method includes directing a shifting mechanism, such as the shifting mechanism 26 shown in FIG. 2, to move a first object-support structure, such as the object-support structure 28 shown in FIG. 2, of a plurality of object-support structures to a first location in a space, such as the space 24 shown in FIG. 2, the first location being located in a three-dimensional space in which an object-shifting apparatus, such as the object-shifting apparatus 22 shown in FIG. 2, operates. In block 1720, the method includes receiving, from the object-shifting apparatus, identifying data, such as, for example, data associated with a unique identifier, associated with an object positioned on the object-support structure. In block 1730, the method includes determining a designated destination of the object based at least in part on the identifying data. In block 1740, the method includes directing the shifting mechanism to move a second object-support structure of the plurality of object-support structures to a second location in the space based on the second object-support structure being associated with the designated destination of the object, the second location being located in the three-dimensional space in which the object-shifting apparatus operates. In block 1750, the method includes directing the object-shifting apparatus to transfer the object from the first object-support structure to the second object-support structure.

Clause 1. A system for shifting objects, the system comprising: a plurality of object-support structures; an object-shifting apparatus configured to: locate and identify an object positioned on a first object-support structure of the plurality of object-support structures when the first object-support structure is positioned adjacent to the object-shifting apparatus, engage the object positioned on the first object-support structure, and transfer the object onto a second object-support structure of the plurality of object-support structures; a shifting mechanism operable to move the plurality of object-support structures to different locations; and a computing device configured to direct operation of: the object-shifting apparatus, and the shifting mechanism.

Clause 2. The system of clause 1, wherein the computing device is configured to direct the shifting of the object based on a designated destination of the object in a logistics network.

Clause 3. The system of any one of clauses 1-2, wherein the shifting mechanism comprises a track, and wherein the plurality of object-support structures are coupled to, and movable along, the track.

Clause 4. The system of any one of clauses 1-3, wherein the object-shifting apparatus comprises at least one object-detection component, and wherein the at least one object-detection component is configured to detect a unique identifier associated with the object.

Clause 5. The system of any one of clauses 1-4, wherein the unique identifier comprises at least one of: a visual indicia, a machine-readable indicia; and a radio frequency identification (RFID) tag.

Clause 6. The system of any one of clauses 1-5, wherein the object-shifting apparatus comprises at least one object-detection component configured to detect a location of the object in a three-dimensional space in which the object-shifting apparatus operates.

Clause 7. The system of any one of clauses 1-6, wherein the object-shifting apparatus comprises at least one object-detection component configured to detect dimensional characteristics of the object.

Clause 8. The system of any one of clauses 1-7, wherein the object-shifting apparatus comprises at least one object-detection component configured to detect an orientation of the object in a three-dimensional space in which the object-shifting apparatus operates.

Clause 9. The system of any one of clauses 1-8, wherein the object-shifting apparatus, the shifting mechanism, and the plurality of object-support structures are located in a mobile transport and are configured to operate in coordination to shift objects while the mobile transport is in transit.

Clause 10. The system of any one of clauses 1-9, wherein the mobile transport comprises a vehicle, a ship, or an aircraft.

Clause 11. The system of any one of clauses 1-10, wherein the object-shifting apparatus comprises one or more object-engaging components configured to adaptively engage objects of a range of different dimensions.

Clause 12. A method for shifting objects, the method comprising: moving, using a shifting mechanism, a first object-support structure to a first location in a space, wherein the first location is adjacent to an object-shifting apparatus; determining, using at least one object-detection component, an identity of an object positioned on the first object-support structure; determining, using the at least one object-detection component, a location of the object in a three-dimensional space in which the object-shifting apparatus operates; moving, using the shifting mechanism, a second object-support structure to a second location in the space, wherein the second location is adjacent to the object-shifting apparatus; engaging, using one or more object-engaging components of the object-shifting apparatus, the object positioned on the first object-support structure; shifting the object to the second object-support structure; and releasing the object onto the second object-support structure.

Clause 13. The method of clause 12, wherein the shifting of the object is performed based on a designated destination of the object in a logistics network, and wherein the designated destination is determined based, at least in part, on the determined identity of the object.

Clause 14. The method of any one of clauses 12-13, wherein the space is located in a mobile transport associated with a logistics network or in a stationary facility associated with a logistics network.

Clause 15. The method of any one of clauses 12-14, wherein the one or more object-engaging components are adapted to engage objects of a range of different dimensions.

Clause 16. The method of any one of clauses 12-15, wherein the second object-support structure is moved to the second location subsequent to determining the identity of the object.

Clause 17. A system for shifting objects during transit, the system comprising: a plurality of object-support structures; a shifting mechanism operable to move the plurality of object-support structures to different locations in a space; an object-shifting apparatus configured to: locate and identify objects positioned on the plurality of object-support structures, and engage and shift the objects to different object-support structures; and a computing device configured to direct operation of: the object-shifting apparatus, and the shifting mechanism.

Clause 18. The system of clause 17, wherein the computing device is configured to direct the shifting of objects based on their designated destinations in a logistics network.

Clause 19. The system of any one of clauses 17-18, wherein the space is located in a mobile transport that operates in a logistics network.

Clause 20. The system of any one of clauses 17-19, wherein the mobile transport comprises a vehicle, a ship, or an aircraft.

Clause 21. An object-shifting apparatus, comprising: a base; a frame extending from the base; and an object-shifting mechanism, the object-shifting mechanism movable to different positions along the frame, and the object-shifting mechanism comprising one or more object-engaging components useable for engaging and shifting objects having a range of different dimensions; and at least one object-detection component configured to: determine a location of an object positioned in a three-dimensional space in which the object-shifting apparatus operates, and determine an identity of the object.

Clause 22. The object-shifting apparatus of clause 21, wherein the at least one object-detection component is further configured to: determine an orientation of the object positioned in the three-dimensional space, and/or determine one or more dimensions of the object positioned in the three-dimensional space.

Clause 23. The object-shifting apparatus of any one of clauses 21-22, wherein the object-shifting mechanism is configured to adaptively engage the object using the one or more object-engaging components based on the determined location and/or orientation and/or dimensions.

Clause 24. The object-shifting apparatus of any one of clauses 21-23, wherein the at least one object-detection component comprises: one or more sensors, and a processor coupled to the one or more sensors, the processor configured to process data received from the one or more sensors to thereby identify the object based on a unique identifier.

Clause 25. The object-shifting apparatus of any one of clauses 21-24, wherein the one or more sensors are associated with one or more cameras.

Clause 26. The object-shifting apparatus of any one of clauses 21-25, wherein the one or more sensors are associated with a Light Detection and Ranging (LIDAR) device.

Clause 27. The object-shifting apparatus of any one of clauses 21-26, wherein the base comprises a wheeled-base, and wherein the frame further comprises a track-engaging structure located at an end of the frame opposite to the base.

Clause 28. The object-shifting apparatus of any one of clauses 21-27, further comprising one or more communication components adapted to communicate with a remote computing device.

Clause 29. The object-shifting apparatus of any one of clauses 21-28, further comprising a door-engaging mechanism useable for engaging, opening, and closing a pair of sliding doors located on an object-support structure.

Clause 30. The object-shifting apparatus of any one of clauses 21-29, further comprising: a shutter coupled to, and movable with, the object-shifting mechanism; and a conveyor coupled to the object-shifting mechanism.

Clause 31. An object-shifting system, comprising: a guide track; a plurality of object-support structures each comprising a track-engaging structure adapted to be coupled to the guide track, thereby allowing the coupled object-support structure to move along the guide track; an object-shifting apparatus, comprising: a base, a frame extending from the base, an object-shifting mechanism, wherein the object-shifting mechanism is movable to different positions along the frame, and wherein the object-shifting mechanism comprises one or more object-engaging components useable for engaging and shifting objects of a range of different dimensions, and at least one object-detection component configured to: determine a location of an object positioned in a three-dimensional space in which the object-shifting apparatus operates, and determine an identity of the object.

Clause 32. The object-shifting system of clause 31, wherein the one or more object-engaging components comprises: a first object-engaging component that is extendable and retractable, and a second object-engaging component that is extendable and retractable.

Clause 33. The object-shifting system of any one of clauses 31-32, wherein the first object-engaging component, at least when extended, is pivotable and/or translatable to facilitate engaging an object, and wherein the second object-engaging component, at least when extended, is pivotable and/or translatable to facilitate engaging an object.

Clause 34. The object-shifting system of any one of clauses 31-33, wherein the first object-engaging component is coupled to a first pressure sensor, and wherein the second object-engaging component is coupled to a second pressure sensor, the first pressure sensor and the second pressure sensor configured to indicate when an object is engaged.

Clause 35. The object-shifting system of any one of clauses 31-34, wherein the object-shifting apparatus includes a lighting element that operates in coordination with the at least one object-detection component.

Clause 36. The object-shifting system of any one of clauses 31-35, wherein the object-shifting apparatus comprises a door-engaging mechanism useable for engaging, opening, and closing a pair of sliding doors located on an object-support structure.

Clause 37. A method of shifting objects using an object-shifting apparatus, the object-shifting apparatus comprising a base, a frame extending from the base, an object-shifting mechanism movable along the frame, and at least one object-detection component, the method comprising: moving the object-shifting mechanism to a position on the frame that is adjacent to an object; detecting the object using the at least one object-detection component; determining an identity of the object based on a unique identifier associated with the object; determining a location of the object in a three-dimensional space in which the object-shifting mechanism operates; engaging the identified and located object using the object-shifting mechanism; and shifting the object to a location associated with a designated destination of the object.

Clause 38. The method of clause 37, wherein the shifting of the object occurs during transit.

Clause 39. The method of any one of clauses 37-38, further comprising determining the designated destination of the object based at least in part on the determined identity of the object.

Clause 40. The method of any one of clauses 37-39, further comprising shifting an object-support structure to a location adjacent to the object-shifting apparatus based at least in part on the determined identity of the object.

Clause 41. A computer-implemented method for directing the shifting of objects, the method comprising: directing a shifting mechanism to move a first object-support structure of a plurality of object-support structures to a first location in a space, the first location being located in a three-dimensional space in which an object-shifting apparatus operates; receiving, from the object-shifting apparatus, identifying data associated with an object positioned on the object-support structure; determining a designated destination of the object based at least in part on the identifying data; directing the shifting mechanism to move a second object-support structure of the plurality of object-support structures to a second location in the space based on the second object-support structure being associated with the designated destination of the object, the second location being located in the three-dimensional space in which the object-shifting apparatus operates; and directing the object-shifting apparatus to transfer the object from the first object-support structure to the second object-support structure.

Clause 42. The computer-implemented method of clause 41, further comprising generating an updated routing status for the object based at least in part on the transfer of the object from the first object-support structure to the second object-support structure.

Clause 43. The computer-implemented method of any one of clauses 41-42, wherein the space is located in a mobile transport operates in a logistics network, and wherein the shifting is directed while the mobile transport is in transit.

Clause 44. The computer-implemented method of any one of clauses 41-43, wherein the space is located in a stationary facility that is part of a logistics network.

Clause 45. The computer-implemented method of any one of clauses 41-44, further comprising: receiving, from the object-shifting apparatus, data comprising a location and/or orientation and/or dimensions of the object; and directing the object-shifting apparatus to engage the object based, at least in part, on the data comprising the location and/or orientation and/or dimensions of the object.

Clause 46. The computer-implemented method of any one of clauses 41-45, wherein the identifying data is obtained from a scan of a machine-readable indicia associated with the object.

Clause 47. The computer-implemented method of any one of clauses 41-46, wherein the identifying data is obtained from a radio frequency identification (RFID) scan of the object.

Clause 48. The computer-implemented method of any one of clauses 41-47, further comprising: receiving, from the object-shifting apparatus, identifying data associated with a separate object located on the first object-support structure; determining a designated destination of the separate object based at least in part on the identifying data associated with the separate object; directing the shifting mechanism to move the second object-support structure away from the object-shifting apparatus; directing the shifting mechanism to move a third object-support structure of the plurality of object-support structures to the second location in the three-dimensional space, wherein the third object-support structure is associated with the designated destination of the separate object; and directing the object-shifting apparatus to shift the separate object from the first object-support structure to the third object-support structure.

Clause 49. The computer-implemented method of any one of clauses 41-48, wherein the identifying data is obtained by one or more sensors located on the object-shifting apparatus.

Clause 50. One or more computer-readable media having computer-executable instructions stored thereon that, when executed by one or more processors, perform a method for directing the shifting of objects, the method comprising: directing a shifting mechanism to move a first object-support structure of a plurality of object-support structures to a first location in a space, the first location being located in a three-dimensional space in which an object-shifting apparatus operates; receiving, from the object-shifting apparatus, identifying data associated with an object positioned on the object-support structure; determining a designated destination of the object based at least in part on the identifying data; directing the shifting mechanism to move a second object-support structure of the plurality of object-support structures to a second location in the space based on the second object-support structure being associated with the designated destination of the object, the second location being located in the three-dimensional space in which the object-shifting apparatus operates; and directing the object-shifting apparatus to transfer the object from the first object-support structure to the second object-support structure.

Clause 51. The one or more computer-readable media of clause 50, wherein the method further comprises generating an updated routing status for the object based at least in part on the transfer.

Clause 52. The one or more computer-readable media of any one of clauses 50-51, wherein the space is located in a mobile transport that operates in a logistics network, and wherein the transfer occurs while the mobile transport is in transit.

Clause 53. The one or more computer-readable media of any one of clauses 50-52, wherein the space is located in a stationary facility that is part of a logistics network.

Clause 54. The one or more computer-readable media of any one of clauses 50-53, wherein the method further comprises: receiving, from the object-shifting apparatus, data comprising a location and/or orientation and/or dimensions of the object; and directing the object-shifting apparatus to engage the object based, at least in part, on the data comprising the location and/or orientation and/or dimensions of the object.

Clause 55. The one or more computer-readable media of any one of clauses 50-54, wherein the identifying data comprises a unique identifier associated with the object.

Clause 56. The one or more computer-readable media of any one of clauses 50-55, wherein the method further comprises determining the designated destination of the object based on the unique identifier.

Clause 57. The one or more computer-readable media of any one of clauses 50-56, wherein the object is a parcel with contents, and wherein the designated destination is a location in a logistics network.

Clause 58. The one or more computer-readable media of any one of clauses 50-57, wherein the method further comprises: receiving, from the object-shifting apparatus, identifying data associated with a separate object located on the first object-support structure; determining a designated destination of the separate object based at least in part on the identifying data associated with the separate object; directing the shifting mechanism to move the second object-support structure away from the object-shifting apparatus; directing the shifting mechanism to move a third object-support structure of the plurality of object-support structures to the second location in the three-dimensional space, wherein the third object-support structure is associated with the designated destination of the separate object; and directing the object-shifting apparatus to shift the separate object from the first object-support structure to the third object-support structure.

Clause 59. The one or more computer-readable media of any one of clauses 50-58, wherein the one or more computer-readable media are integrated with a computing device coupled to a mobile transport that operates in a logistics network.

Clause 60. A computer system, comprising: at least one processor; at least one memory; and one or more computer-readable media having computer-executable instructions stored thereon that, when executed by one or more processors, execute a method for directing the shifting of objects, the method comprising: directing a shifting mechanism to move a first object-support structure of a plurality of object-support structures to a first location in a space, the first location being located in a three-dimensional space in which an object-shifting apparatus operates; receiving, from the object-shifting apparatus, identifying data associated with an object positioned on the object-support structure; determining a designated destination of the object based at least in part on the identifying data; directing the shifting mechanism to move a second object-support structure of the plurality of object-support structures to a second location in the space based on the second object-support structure being associated with the designated destination of the object, the second location being located in the three-dimensional space in which the object-shifting apparatus operates; and directing the object-shifting apparatus to transfer the object from the first object-support structure to the second object-support structure.

Clause 61. Any one of the preceding clauses 1-60 in any combination.

In some embodiments, this disclosure may include the language, for example, "at least one of [element A] and [element B]." This language may refer to one or more of the elements. For example, "at least one of A and B" may refer to "A," "B," or "A and B." In other words, "at least one of A and B" may refer to "at least one of A and at least one of B," or "at least either of A or B." In some embodiments, this disclosure may include the language, for example, "[element A], [element B], and/or [element C]." This language may refer to either of the elements or any combination thereof. In other words, "A, B, and/or C" may refer to "A," "B," "C," "A and B," "A and C," "B and C," or "A, B, and C." In addition, this disclosure may use the term "and/or" which may refer to any one or combination of the associated elements.

The subject matter of this disclosure has been described in relation to particular embodiments, which are intended in all respects to be illustrative rather than restrictive. Alternative embodiments will become apparent to those of ordinary skill in the art to which the present subject matter pertains without departing from the scope hereof. Different combinations and sub-combinations of elements, as well as use of elements not shown, are also possible and contemplated.

What is claimed is:

1. An object-shifting system comprising:
a guide track;
a plurality of object-support structures each comprising a wheeled base and a track-engaging structure adapted to be coupled to the guide track, thereby allowing the object-support structure to move along the guide track, the plurality of object-support structures comprising a first object-support structure and a second object-support structure;
a shifting mechanism that operates, via the track-engaging structure, to move at least one of the first object-support structure or the second object-support structure along the guide track to cause the wheeled base to roll along a surface to a location that is adjacent to an object-shifting apparatus;
the object-shifting apparatus, comprising:
a base,
a frame extending from the base,
an object-shifting mechanism,
wherein the object-shifting mechanism is movable to different positions along the frame, and
wherein the object-shifting mechanism comprises one or more object-engaging components useable for engaging and shifting objects of a range of different dimensions,
at least one object-detection component configured to:
determine a location of an object positioned on the first object-support structure in a three-dimensional space in which the object-shifting apparatus operates, and
determine an identity of the object; and
a computer system configured to:
direct the shifting mechanism to move at least one of the first object-support structure or the second object-support structure along the guide track to cause the wheeled base to roll along the surface to the location that is adjacent to the object-shifting apparatus; and
identify the second object-support structure that is associated with a designated destination of the object and direct the object-shifting mechanism to shift the object from the first object-support structure to the second object-support structure.

2. The object-shifting system of claim 1, wherein the one or more object-engaging components comprises:
a first object-engaging component that is extendable and retractable, and
a second object-engaging component that is extendable and retractable.

3. The object-shifting system of claim 2, wherein each of the first object-engaging component and the second object-engaging component, at least when extended, is at least one of pivotable or translatable to facilitate engaging the object.

4. The object-shifting system of claim 2, wherein each of the first object-engaging component and the second object-engaging component is coupled to a pressure sensor configured to indicate when the object is engaged.

5. The object-shifting system of claim 1, wherein the object-shifting apparatus includes a lighting element that operates in coordination with the at least one object-detection component.

6. The object-shifting system of claim 1, wherein the object-shifting apparatus comprises a door-engaging mechanism configured to engage, open, and close a pair of sliding doors located on at least one of the first object-support structure or the second object-support structure.

7. A method comprising:
moving an object-shifting mechanism of an object-shifting apparatus that comprises a base and a frame extending from the frame to a position on the frame that is adjacent to an object positioned on a first object-support structure of a plurality of object-support structures;
detecting the object using at least one object-detection component of the object-shifting apparatus;
determining an identity of the object based on detection of a unique identifier associated with the object, wherein the unique identifier is associated with a designated destination to which the object is being routed;
identifying a second object-support structure of the plurality of object-support structures that is associated with the designated destination;
shifting the second object-support structure, via a shifting mechanism, to a position adjacent to the object-shifting mechanism, such that the first object-support structure and the second object-support structure are positioned on opposite sides of the object-shifting mechanism, wherein the shifting mechanism shifts the second object-support structure by guiding a track-engaging structure for the second object-support structure to move the second object-support structure along a track and cause a wheeled base of the second object-support structure to roll along a surface;
engaging the object using the object-shifting mechanism; and
shifting the object from the first object-support structure onto the second object-support structure.

8. The method of claim 7, wherein shifting the object from the first object-support structure onto the second object-support structure occurs during transit of a vehicle from a first physical location to a second physical location.

9. The method of claim 7, wherein the object-shifting mechanism comprises a pair of object-engaging components and a conveyor that shifts the object laterally across the object-shifting mechanism, and shifting the object from the first object-support structure comprises pulling the object from the first object-support structure using the pair of object-engaging components and translating the object using the conveyor.

10. The method of claim 9, wherein the object is shifted through the object-shifting mechanism using the conveyor.

11. One or more computer-readable media having computer-executable instructions stored thereon that, when executed by one or more processors, perform operations comprising:
directing an object-shifting mechanism of an object-shifting apparatus that comprises a base and a frame extending from the frame to move to a position on the frame that is adjacent to an object positioned on a first object-support structure of a plurality of object-support structures;

detecting, via an object-detection component of the object-shifting apparatus, the object;

determining an identity of the object based on detection of a unique identifier associated with the object, wherein the unique identifier is associated with a designated destination to which the object is being routed;

identifying a second object-support structure of the plurality of object-support structures that is associated with the designated destination;

directing a shifting mechanism to shift the second object-support structure to a position adjacent to the object-shifting mechanism, such that the first object-support structure and the second object-support structure are positioned on opposite sides of the object-shifting mechanism, wherein the shifting mechanism shifts the second object-support structure by guiding a track-engaging structure for the second object-support structure to move the second object-support structure along a track and cause a wheeled base of the second object-support structure to roll along a surface;

directing the object-shifting mechanism to engage the object; and directing the object-shifting mechanism to shifting the object from the first object-support structure onto the second object-support structure.

12. The one or more computer-readable media of claim 11, wherein the operations further comprise determining, via the object-detection component, at least one of an orientation or dimensions of the object prior to directing the object-shifting mechanism to engage the object.

13. The one or more computer-readable media of claim 12, wherein directing the object-shifting mechanism to engage the object involves directing one or more object-engaging components of the object-shifting mechanism to engage the object based on at least one of the orientation or the dimensions of the object.

14. The one or more computer-readable media of claim 11, wherein the object-detection component comprises one or more sensors.

15. The one or more computer-readable media of claim 14, wherein the one or more sensors are associated with one or more cameras.

16. The one or more computer-readable media of claim 14, wherein the one or more sensors are associated with a Light Detection and Ranging (LIDAR) device.

17. The one or more computer-readable media of claim 11, wherein the operations further comprise directing a door-engaging mechanism to engage, open, and close a pair of sliding doors located on at least one of the first object-support structure or the second object-support structure.

18. The one or more computer-readable media of claim 11, wherein the operations further comprise directing a shutter to move vertically along the frame with the object-detection component to limit a field of view of the object-detection component.

* * * * *